United States Patent
Rose et al.

(10) Patent No.: US 12,526,239 B1
(45) Date of Patent: Jan. 13, 2026

(54) OPTICAL TRANSPORT NETWORK (OTN) PATH COMPUTATION WITH CROSS-VENDOR INTEGRATION

(71) Applicant: LIGHTRIVER TECHNOLOGIES, INC., Concord, CA (US)

(72) Inventors: Daniel W. Rose, Red Bank, NJ (US); Kenneth L. Cinque, Lincroft, NJ (US); David F. Cohen, Middletown, NJ (US); Jake Norman Barrow, Rahway, NJ (US); Francis Santitoro, Freehold, NJ (US)

(73) Assignee: LIGHTRIVER TECHNOLOGIES, INC., Concord, CA (US)

( * ) Notice: Subject to any disclaimer, the term of this patent is extended or adjusted under 35 U.S.C. 154(b) by 0 days.

(21) Appl. No.: 19/309,368

(22) Filed: Aug. 25, 2025

(51) Int. Cl.
H04L 47/25 (2022.01)
H04B 10/27 (2013.01)
H04L 47/52 (2022.01)

(52) U.S. Cl.
CPC ............ *H04L 47/25* (2013.01); *H04B 10/27* (2013.01); *H04L 47/52* (2013.01)

(58) Field of Classification Search
CPC .......... H04L 47/25; H04L 47/52; H04B 10/27
USPC ........................................................ 709/224
See application file for complete search history.

(56) References Cited

U.S. PATENT DOCUMENTS

| | | | |
|---|---|---|---|
| 6,564,258 B1* | 5/2003 | Uniacke ............. | H04L 43/0811 709/224 |
| 2013/0121686 A1* | 5/2013 | Voigt .................. | H04L 43/0811 398/19 |
| 2018/0041905 A1* | 2/2018 | Ashrafi ............... | H04L 67/10 |
| 2018/0295429 A1* | 10/2018 | Swinkels ........... | H04Q 11/0005 |
| 2018/0376338 A1* | 12/2018 | Ashrafi ............... | H04L 41/0895 |
| 2019/0215248 A1* | 7/2019 | D'Ippolito .......... | H04L 41/22 |

FOREIGN PATENT DOCUMENTS

CN 100413259 C * 8/2008 ........... H04L 43/065

\* cited by examiner

*Primary Examiner* — Ruolei Zong
(74) *Attorney, Agent, or Firm* — Sterne, Kessler, Goldstein & Fox, P.L.L.C.

(57) ABSTRACT

Some embodiments include a method for computing a path across multi-vendor and multi-generational equipment where the latter can include obsolete equipment. Some embodiments include utilizing service hierarchies to determine available bandwidth in a fiber optic network given an input frequency width (FW) for wavelength carrier service routing, determining available routes that satisfy the FW, as well as timeslot availability (e.g., bandwidth availability) along an established carrier service at a specified client service data rate. Some embodiments include mapping a lowest transmission rate of the obsolete equipment to various fiber optic network standards. Some embodiments utilize the mapped information with OTN service discovery and service hierarchies to track timeslots of the obsolete equipment along the computed path across multi-vendor and multi-generational networks. Some embodiments include carrier service bridging and timeslot switching as well as path trace verification.

20 Claims, 17 Drawing Sheets

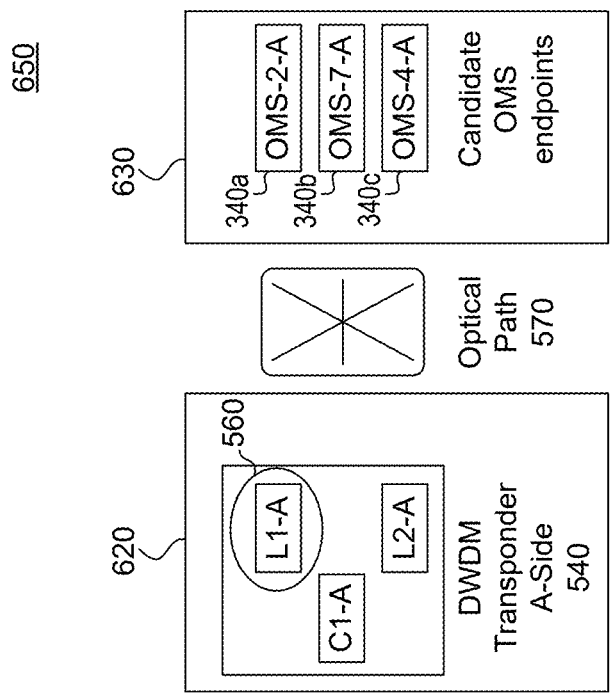
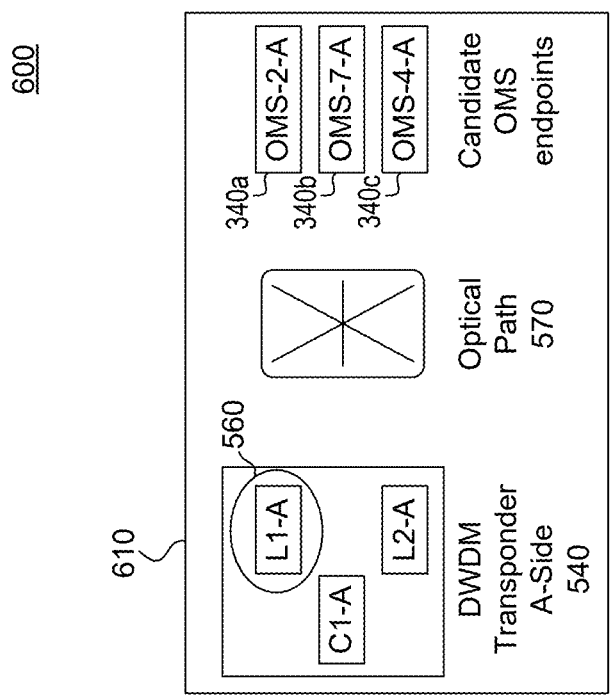
FIG. 6B
FIG. 6A

1300

DWDM Transponder 1140

Unique-123

| | Card: 20P200-5-3 | |
|---|---|---|
| | Client | Line |
| | -- OC192-5-3-5<br>---- ODU2-5-3-5 | -- 20P200-5-3-BP1<br>--- OTL4.10-5-3-BP1<br>---- ODU4-5-3-BP1<br>----- ODU4ODU2-5-3-BP1-33 |

ODU2 (192 STS1s)

| ODU2 TS | ODU0 TS Range | STS-1 TS Range |
|---|---|---|
| ODU2#1 | ODU0#1-10<br>-- ODU0#1 | STS1#1-192<br>-- STS-1#1 |

ODU4 (1920 STS1s)

| ODU2 TS | ODU0 TS Range | STS-1 TS Range |
|---|---|---|
| ODU2#1 | ODU0#1-8 | STS-1#1-192 |
| ODU2#2 | ODU0#9-16 | STS-1#193-384 |
| ODU2#3 | ODU0#17-24 | STS-1#385-576 |
| ODU2#4 | ODU0#25-32 | STS-1#577-768 |
| ODU2#5<br>-- ODU0#1 | ODU0#33-40<br>-- ODU0#33 | STS-1#769-960<br>-- STS-1#769 |
| ODU2#6 | ODU0#41-48 | STS-1#961-1152 |
| ODU2#7 | ODU0#49-56 | STS-1#1153-1344 |
| ODU2#8 | ODU0#57-64 | STS-1#1345-1536 |
| ODU2#9 | ODU0#65-72 | STS-1#1537-1728 |
| ODU2#10 | ODU0#73-80 | STS-1#1729-1920 |

Relative Timeslot Position
Always first STS-1 in the first
ODU0 within the current ODU2

Relative Timeslot
1342

Absolute Timeslots
1346

ODU4#1, ODU2#5, ODU0#33, STS-1#769

OTN Switch Domain 1150

Unique-121

| Card: 20P200-7-2 | |
|---|---|
| Backplane – BP1 | Backplane – BP2 |
| -- 20P200-7-2-BP1<br>--- OTL4.10-7-2-BP1<br>---- ODU4-7-2-BP1<br>----- ODU4ODU2-7-2-BP1-33 | -- 20P200-7-2-BP1<br>--- OTL4.10-7-2-BP1<br>---- ODU4-7-2-BP1<br>←----- ODU4ODU2-7-2-BP1-33→ |

ODU2 (1920 STS1s)

| ODU2 TS | ODU0 TS Range | STS-1 TS Range |
|---|---|---|
| ODU2#1 | ODU0#1-8 | STS-1#1-192 |
| ODU2#2 | ODU0#9-16 | STS-1#193-384 |
| ODU2#3 | ODU0#17-24 | STS-1#385-576 |
| ODU2#4 | ODU0#25-32 | STS-1#577-768 |
| ODU2#5 -- ODU0#1 | ODU0#33-40 -- ODU0#33 | STS-1#769-960 -- STS-1#769 |
| ODU2#6 | ODU0#41-48 | STS-1#961-1152 |
| ODU2#7 | ODU0#49-56 | STS-1#1153-1344 |
| ODU2#8 | ODU0#57-64 | STS-1#1345-1536 |
| ODU2#9 | ODU0#65-72 | STS-1#1537-1728 |
| ODU2#10 | ODU0#73-80 | STS-1#1729-1920 |

1352 — ODU4#1, ODU2#5, ODU0#33, STS-1#769

ODU4 (1920 STS1s)

| ODU2 TS | ODU0 TS Range | STS-1 TS Range |
|---|---|---|
| ODU2#1 | ODU0#1-8 | STS-1#1-192 |
| ODU2#2 | ODU0#9-16 | STS-1#193-384 |
| ODU2#3 | ODU0#17-24 | STS-1#385-576 |
| ODU2#4 | ODU0#25-32 | STS-1#577-768 |
| ODU2#5 | ODU0#33-40 | STS-1#769-960 |
| ODU2#6 | ODU0#41-48 | STS-1#961-1152 |
| ODU2#7 | ODU0#49-56 | STS-1#1153-1344 |
| ODU2#8 | ODU0#57-64 | STS-1#1345-1536 |
| ODU2#9 | ODU0#65-72 | STS-1#1537-1728 |
| ODU2#10 -- ODU0#1 | ODU0#73-80 -- ODU0#73 | STS-1#1729-1920 -- STS-1#1729 |

1354 — ODU4#1, ODU2#10, ODU0#73, STS-1#1729

FIG. 13B

OPTICAL TRANSPORT NETWORK (OTN) PATH COMPUTATION WITH CROSS-VENDOR INTEGRATION

FIELD OF THE INVENTION

The embodiments relate generally to optical path computations.

BACKGROUND

Communication networks often includes communication devices from multiple vendors and multiple generations of network technology.

Network managers and network management systems of networks providing services with multi-vendor and multi-generational devices face challenges in managing their communications networks. For example, networks with multi-vendor devices encounter difficulties in determining end-to-end service path visibility as device information from one vendor-specific report differs from another vendor-specific report for a neighboring device. Multi-generational networks can include devices that are obsolete; obsolete devices are no longer supported or maintained by their manufacturer even though they may be actively utilized in a network. As optical networks become increasingly disaggregated with different vendors providing distinct network components, a way to determine optimal paths across an Optical Transport Network (OTN) that includes multi-vendor and multi-generational components is needed.

BRIEF SUMMARY

Some embodiments include a system, apparatus, method, and computer program product for optical transport network (OTN) path computation with cross-vendor integration, where cross-vendor integration can include multi-generational equipment from different vendors. Some embodiments include a memory and a processor, where the processor can (a) access real-time inventory data of equipment in an OTN where the equipment comprises multi-vendor and multi-generational equipment; (b) determine, based on the real-time inventory data, optical service hierarchies including intra network element topologies; (c) determine, based on the optical service hierarchies, one or more paths between an A-Endpoint and a Z-Endpoint such that (i) the determined one or more paths support a requested frequency width (FW) and (ii) a first path of the determined one or more paths comprise one or more optical multiplex sections (OMSs) of the OTN; (d) determining carrier-level routes where the carrier-level route transports a carrier service between the A-Endpoint and the Z-Endpoint; and (e) determine a client-level route via the first path, where the client-level route transports a client service, where at least one of the A-Endpoint or the Z-Endpoint provides a point of presence (POP) for the client service to an obsolete equipment of the multi-generational equipment.

In some examples, the obsolete equipment includes a client-service eligible endpoint of a synchronous optical network (SONET) device supporting a synchronous transport signal level-1 (STS-1) data rate, where the client-level route comprises optical data unit (ODU) timeslot switching. The processor can also determine that a network element (NE) on the first path includes optical data unit (ODU) connection bandwidth supporting the requested FW, where the NE receives data for the client service via a first block of ODU timeslots, where the NE performs ODU timeslot switching to transmit the data via a second block of ODU timeslots. In some examples, the ODU timeslot switching occurs via a backplane port (BP) or a line port.

In some embodiments, where the obsolete equipment is a first synchronous optical network (SONET) device, the A-Endpoint provides the POP for the client service, and the Z-Endpoint provides a second POP for the client service for a second SONET device, the processor can trace the client-level route by: (a) tracking relative timeslots of an synchronous transport signal level-1 (STS-1) signal from the first SONET device to the second SONET device; and (b) tracking corresponding absolute timeslots at higher transmission rates.

In some examples where the client-level route includes a NE, tracking the relative timeslots includes tracing optical paths within the NE that include an optical adjacency and a cross card mapping to a connection termination point (CTP). The processor can also determine a carrier-level route via the first path, where the carrier-level route transports the client-level route. In some embodiments, the first path can include: a given center frequency (CF); a shortest number of hops or a shortest geolocation distance from A-End to Z-End; a list to include one or more first network elements (NEs); or a list to exclude one or more second NEs.

BRIEF DESCRIPTION OF THE DRAWINGS/FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 6A illustrates an example of carrier service path computation with carrier endpoint and OMS endpoint co-location, according to some embodiments of the disclosure.

FIG. 6B illustrates an example of carrier service path computation where carrier and OMS endpoints are not on a same network element (NE), according to some embodiments of the disclosure.

FIGS. 13A and 13B illustrate examples of ODU time slot switching for trace computation, according to some embodiments of the disclosure.

Figure 1:
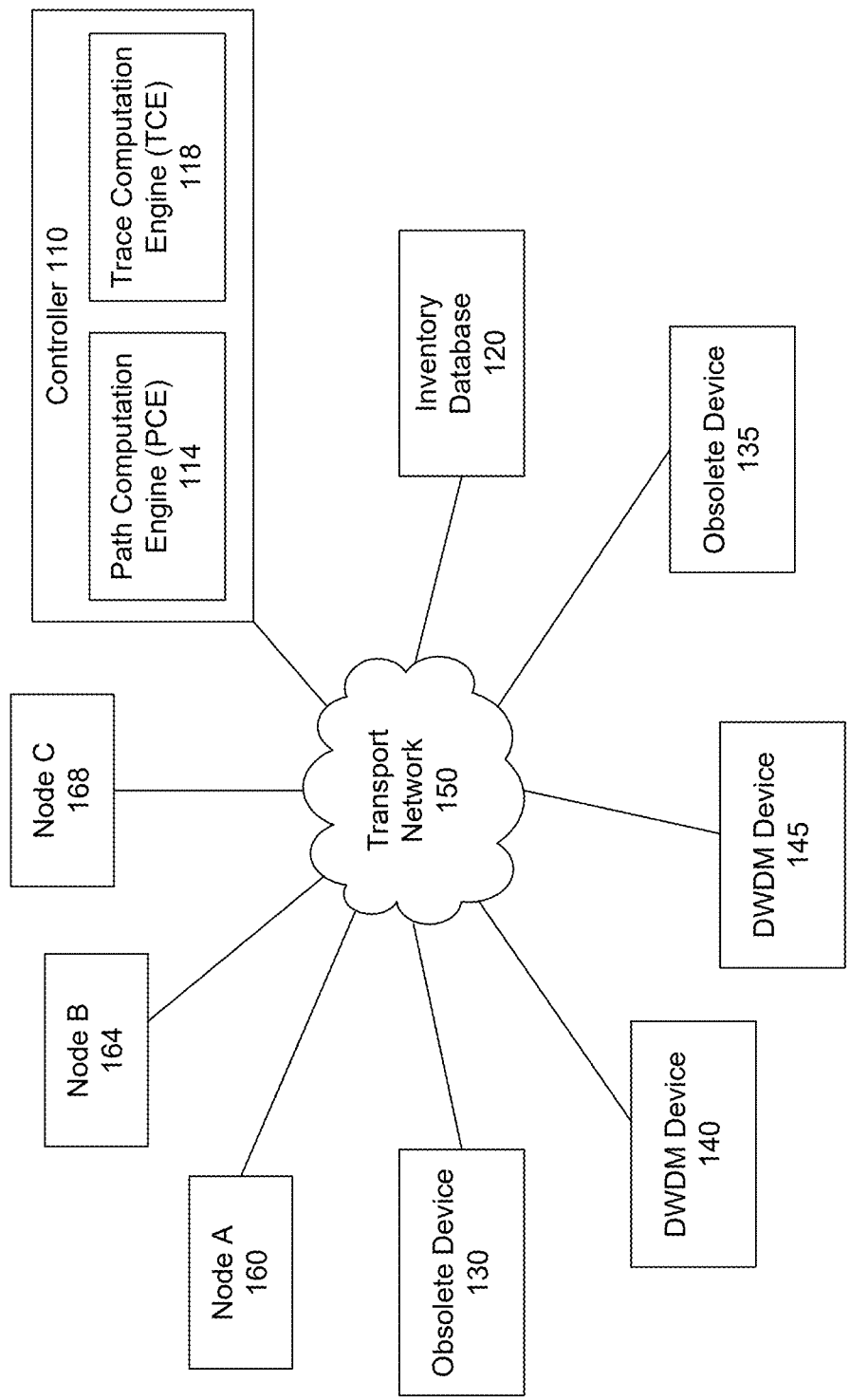
FIG. 1 illustrates an example system for optical transport network (OTN) path computation with cross-vendor integration, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Some embodiments include a system, apparatus, article of manufacture, method, and/or computer program product and/or combinations and sub-combinations thereof, for optical transport network (OTN) path computation with cross-vendor integration, where cross-vendor integration can include multi-vendor and multi-generational equipment. As service providers expand their communication networks and introduce new and improved dense wavelength division multiplexing (DWDM) devices, service providers face challenges of maintaining older, even obsolete equipment that are still in operation. In some cases, the obsolete equipment may be too costly to replace. Some embodiments include mapping a lowest transmission rate of the obsolete equipment to various fiber optic network standards. Some embodiments utilize the mapped information with OTN service discovery and service hierarchies to enable path computations across multi-vendor and multi-generational networks that can include obsolete equipment.

FIG. 1 illustrates example system 100 for optical transport network (OTN) path computation with cross-vendor integration, in accordance with some embodiments of the disclosure. System 100 can be referred to as a multi-vendor, multi-generational network that can include but is not limited to controller 110, inventory database 120, and transport network 150. Transport network 150 can connect network elements (NEs) by optical fiber links and/or electrical circuits. Transport network 150 and the network elements (NEs) thereon can operate at the physical layer of the Open Systems Interconnect model. NEs can include but are not limited to obsolete devices 130 and 135, DWDM devices 140 and 145, Node A 160, Node B 164, and Node C 168. An example of an obsolete device 130 and 135 can include but is not limited to a synchronous optical network/synchronous digital hierarchy (SONET/SDH) device. DWDM devices 140 and 145 can include but are not limited to a reconfigurable optical add-drop multiplexer (ROADM), optical amplifiers, and/or a transponder. A node (e.g., Node A 160, Node B 164, Node C 168) can be an NE that includes but is not limited to one or more DWDM devices, WDM devices, amplifiers, optical filters (e.g., an optical multiplexer/demultiplexer) and transponders.

The NEs can provide functions for transporting, multiplexing, switching, managing, supervising and survivability of optical channels carrying client signals. An NE may re-time, re-amplify, or re-shape photonic light signals from the optical fiber links. Payloads from various clients are transported across transport network 150, preserving the clients' native structure, timing information, and management information. Facilities in transport network 150 can be multiplexed at different wavelengths of light. The payloads can include any type of network traffic including multimedia services, mobile applications, social media, VoIP, and cloud computing. The enhanced multiplexing capability of optical transport networking allows different traffic types—including Ethernet, storage, and digital video to be carried over a single Optical Transport Unit (OTU) frame. Transport network 150 can also include electrical connections (e.g., electrical transmission facilities) and the NEs can provide functions for transporting, multiplexing, switching, managing, supervision and survivability of communication channels carrying client signals.

Transport network 150 can include backbone transmissions, can extend into data centers, and directly to homes and businesses. Data centers include equipment and can include Central Offices (e.g., network offices that may be identified by a common language location identification (CLLI) code). Network offices can include multi-vendor and multi-generational devices (e.g., NEs) that can include, for example, a SONET/SDH device that is considered an obsolete equipment as many are no longer supported by their respective manufacturers, a circuit emulation (CEM) device that supports packet switching services can be a more modern device than a SONET/SDH device, and a digital cross-connect system (DCS) that enables cross connections between inter-office facilities and local facilities (e.g., supporting inter-office services) as well as cross connections between local facilities (e.g., supporting local services).

Controller 110 can be an optical controller that can execute operations to manage components of system 100. Controller 110 can be implemented in an electronic device close to transport network 150 or in a data center with portions of transport network 150. In some examples, controller 110 can be installed on: a customer's internal network, or on a different data center through a secure, cloud-based connection. Controller 110 can perform functions of path computation engine (PCE) 114 and trace computation engine (TCE) 118 described further below.

Inventory database 120 can be a multi-vendor/multi-generational domain controller database. Inventory database 120 enables real-time tracking of different customers, their associated network services (e.g., VLAN, Ethernet, Internet, etc.), and the NEs used to provide the network services. When a new service is added to inventory database 120, a provisioning server (e.g., controller 110) may push configuration messages to NEs, and the configured NEs are recorded in inventory database 120. When an existing service is modified, for example, to change a service level, the provisioning server may look to inventory database 120 to determine which NEs to send messages to. In this way, a central provisioning server (e.g., controller 110) and inventory database 120 may determine which NEs need to be configured. In some examples, inventory database 120 can be an analytical database, or can include analytical database functions.

Some embodiments for OTN path computation include a controller (e.g., controller 110) performing PCE 114 functions that include determining an available bandwidth (e.g., frequency range and/or specific frequencies) between two network elements or between geographical regions in a multi-vendor, multi-generational network. Controller 110 can determine carrier-level routes (e.g., at the optical channel (OCH)-level) between carrier eligible endpoints in a multi-vendor, multi-generational network. Controller 110 can also compute client-level routes (e.g., at the optical data unit (ODU)-level) between client service eligible endpoints in a multi-vendor, multi-generational network. The computing can include determining ODU-level bandwidth and ODU timeslot switching possibilities along a route. Further, the client-service eligible endpoints can be SONET edge devices. Some embodiments include controller 110 performing TCE 118 functions to verify the various routes across the multi-vendor and multi-generational network (e.g., system 100 of FIG. 1).

Figure 2:
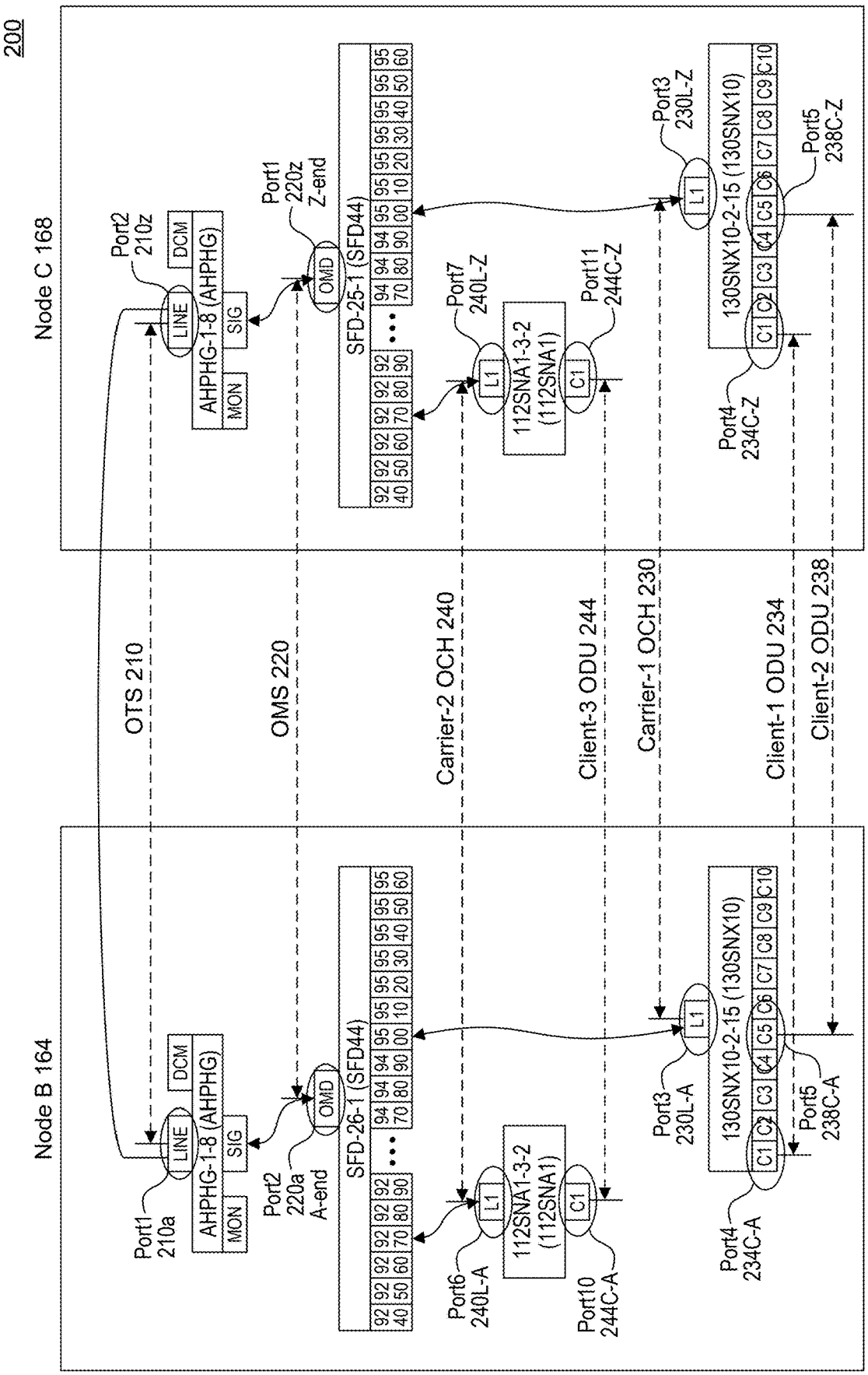
FIG. 2 illustrates an example of a network topology view of an optical service hierarchy, in accordance with some embodiments of the disclosure.

FIG. 2 illustrates example 200 of a network topology view of an optical service hierarchy, in accordance with some embodiments of the disclosure. As a convenience and not a limitation, FIG. 2 may be described with reference to elements from other figures in the disclosure. For example, FIG. 2 can illustrate at a high level, interactions between controller 110 and inventory database 120 of FIG. 1 as well as a network topology view of services between Node B 164, an A-endpoint, and Node C 168, a Z-endpoint. Example 200 is based on the service hierarchy as shown in Table 1 below. In this disclosure, the terms end and endpoint are used interchangeably (e.g., A-end, A-endpoint):

TABLE 1

Example of Service Hierarchy

| Span/Service | Path |
|---|---|
| OTS 210 | NodeB.Port1 210a; NodeC.Port2 210z |
| OMS 220 | NodeB.Port2 220a, NodeB.Port1 210a; NodeC.Port2 210z, NodeC.Port1 220z |
| Carrier1 OCH 230 | NodeB.Port3 230 L-A, NodeB.Port2 220a, NodeB.Port1 210a; NodeC.Port2 210z, NodeC.Port1 220z, NodeC.Port3 230 L-Z |
| Client1 ODU 234 | NodeB.Port4 234 C-A, NodeB.Port3 230 L-A, NodeB.Port2 220a, NodeB.Port1 210a; NodeC.Port2 210z, NodeC.Port1 220z, NodeC.Port3 230 L-Z, NodeC.Port4 234 C-Z |
| Client2 ODU 238 | NodeB.Port5 238 C-A, NodeB.Port3 230 L-A, NodeB.Port2 220a, NodeB.Port1 210a; NodeC.Port2 210z, NodeC.Port1 220z, NodeC.Port3 230 L-Z, NodeC.Port5 238 C-Z |
| Carrier2 OCH 240 | NodeB.Port6 240 L-A, NodeB.Port2 220a, NodeB.Port1 210a; NodeC.Port2 210z, NodeC.Port1 220z, NodeC.Port7 240 L-Z |
| Client3 ODU 244 | NodeB.Port10 244 C-A, NodeB.Port6 240 L-A, NodeB.Port2 220a, NodeB.Port1 210a; NodeC.Port2 210z, NodeC.Port1 220z, NodeC.Port7 240 L-Z, NodeC.Port11 244 C-Z |

Controller 110 can access multi-vendor, multi-generational network (e.g., system 100 of FIG. 1) NE data from inventory database 120 and can perform corresponding extract, transform, load (ETL) processes to normalize the data stored in inventory database 120. In other words, controller 110 can access real-time inventory data of equipment of an OTN, where the equipment comprises multi-vendor and multi-generational equipment (e.g., system 100 of FIG. 1). The normalization of the data can include but is not limited to the data abstraction and assembly processes that can include but are not limited to the following:

Facility hierarchy that includes the logical substructure of physical ports;

Timeslot standardization at the SONET transport signal level-1 (STS-1) for ports where timeslots are allocated. STS-1 signals operate at 51.84 Mbps;

Optical adjacencies—physical port to physical port fiber links across NE components (e.g., cards); and Cross connects (xcon)—inter-connections of logical ports (e.g., Connection Termination Points (CTPs); these are usually inter-card connections but can be across cards (e.g., within a card).

Controller 110 can discover and store the OTN span/service hierarchy, including each service's end points and service path. Thus, controller 110 can discover and store at inventory database 120, data about optical transmission sections (OTSs) (e.g., OTS 210) and optical multiplex sections (OMSs) (e.g., OMS 220), including endpoints, ports, optical adjacencies, xcons, as well as wavelength spectrum usage. In addition, carrier services (e.g., Carrier1 optical channel (OCH) 230 and Carrier2 OCH 240) as well as client services include but are not limited to used frequencies (e.g., center frequency and frequency width (FW)), endpoints, ports, optical adjacencies, and xcons that controller 110 can discover and store at inventory database 120. Similarly, controller 110 can discover and store client services (e.g., Client1 optical data unit (ODU) 234, Client2 ODU 238, and Client3 ODU 244) data at inventory database 120. Also, controller 110 can discover and store carrier services (e.g., Carrier1 OCH 230, Carrier2 OCH 240). Controller 110 can establish parent/child relationships from OTS 210 to OMS 220 to carrier OCH layer (e.g., Carrier1 OCH 230, Carrier2 OCH 240) to client ODU layer (e.g., Client1 optical data unit (ODU) 234, Client2 ODU 238, and Client3 ODU 244) using overlapping service paths as shown in FIG. 2. Controller can also access geographic coordinates for each NE.

For example, the OTS 210 span can be identified by the path from NodeB.Port1 210a to NodeC.Port2 210z.

OMS 220 span can be identified by the path from NodeB.Port2 220a that follows an optical adjacency and an xcon to NodeB.Port1 210a, to NodeC.Port2 210z that follows an xcon and an optical adjacency NodeC.Port1 220z. Note that the OMS 220 span overlaps the span of OTS 210.

Carrier1 OCH 230 service can be identified by the path from NodeB.Port3 230 L-A on the line-side of A-end, following an optical adjacency and xcon to NodeB.Port2 220a, the A-end of OMS 220, and overlaps the span of OMS 220 to NodeC.Port1 220z. The path continues, following an xcon and an optical adjacency to NodeC.Port3 230 L-Z on the line-side of Z-end.

Client1 ODU 234 service can be identified by the path from NodeB.Port4 234 C-A on the client-side of A-endpoint following an xcon to NodeB.Port3 230 L-A, the A-endpoint of Carrier1 OCH 230, overlaps the service of Carrier1 OCH 230 to the Z-endpoint of Carrier1 OCH 230, NodeC.Port3 230 L-Z, follows an xcon to NodeC.Port4 234 C-Z.

Client2 ODU 238, Carrier2 OCH 240, and Client3 ODU 244 service paths can also be determined by controller 110 and stored in inventory database 120. Accordingly, controller 110 can determine an OMS path (e.g., OMS 220) along an OTS (e.g., OTS 210). Further, controller 110 can determine a carrier-level route (e.g., Carrier1 OCH 230) that follows the OMS path (e.g., OMS 220), and a client-level route (e.g., Client1 ODU 234) that follows the carrier-level route (e.g., Carrier1 OCH 230).

Controller 110 can also determine spectrum usage and store the spectrum usage assembly at inventory database 120. Examples of OMS spectrum availability within a service hierarchy are shown in Table 2 below.

TABLE 2

OMS Spectrum Availability within Service Hierarchy

| Span/ Service | Start Freq. (THz) | Center Freq. (THz) | End Freq. (THz) | Freq. Width (THz) | Bandwidth (ODU) | Bandwidth (STS-1) |
|---|---|---|---|---|---|---|
| OTS 210 | | | | | | |
| OMS* 220 | 191.55 | 193.75 | 195.95 | 4.4 | | |
| Carrier1 OCH 230 | 195.55 | 195.60 | 195.65 | 0.1 | 100 GB- (1 OTU4/ 80 ODU0s) | 1920 |
| Client1 ODU 234 | | | | | 10 GB- 8 ODU0 | 192 |
| Client2 ODU 238 | | | | | 40 GB- 32 ODU0 | 768 |
| Carrier2 OCH 240 | 193.15 | 193.20 | 193.25 | 0.1 | 100 GB- 80 (OTU4/ 80 ODU0s) | 1920 |
| Client3 ODU 244 | | | | | 10 GB- 8 ODU0 | 192 |

*Only 0.2 THz of the available 4.4 THz is used.

Table 2 illustrates a span or service along with the corresponding frequencies including the start frequency, center frequency, end frequency, frequency width (FW), bandwidth in ODU and bandwidth in STS-1. OMS 220's spectrum begins at 191.55 THz and ends at 195.95 THz. The frequency width is the difference between the starting frequency and the ending frequency of 4.4 THz. The center frequency is 193.75 THz. Carrier1 OCH 230 begins at 195.55 THz and ends at 195.65 THz with a difference (e.g., frequency width) of 0.1 THz. The center frequency is 195.60 THz. The ODU bandwidth of Carrier1 OCH 230 is 100 GB.

As mentioned above, some embodiments include timeslot standardization at the STS-1 level for ports where timeslots are allocated. STS-1 signals operates at 51.84 Mbps. Bandwidths can be converted to OTN rates as shown in Table 3 below.

TABLE 3

Example STS-1 Rates Corresponding to OTN Rates

| SONET | OTN | ≈SIZE |
|---|---|---|
| STS-1 | | 51.84 Mb/s |
| 24 STS-1 | ODU0 | 1.25 Gb/s |
| 192 STS-1 | ODU2 | 10 Gb/s |
| 1920 STS-1 | ODU4 | 100 Gb/s |

Returning to Table 2, the ODU bandwidth of Carrier1 OCH 230 at 100 GB corresponds to the OTN rate of 1 ODU4 which is equivalent to 80 ODU0s. Thus the corresponding STS-1 bandwidth is shown as 1920. In other words, controller 110 can access inventory database 120 and track 1920 STS-1 timeslots within Carrier1 OCH 230 at 100 GB. Further, controller 110 can track Client1 ODU 234 that uses 10 GB of Carrier1 ODU 234's 100 GB bandwidth. The Client1 ODU 234 bandwidth of 10 GB uses 8 ODU0s, corresponding to bandwidth of 192 STS-1 timeslots. Client2 ODU 238 utilizes 40 GB of Carrier1 OCH 230's bandwidth that corresponds to 768 STS-1 time slots.

Carrier2 OCH 240 begins at 193.15 THz and ends at 193.25 THz with a difference (e.g., frequency width) of 0.1 THz. Thus, the total frequency width being used by both carriers 1 and 2 totals only 0.2 THz of the available 4.4 THz. Accordingly, controller 110 can determine that OMS 220 has 4.2 THz available bandwidth in the service hierarchy of example 200.

Figure 3:
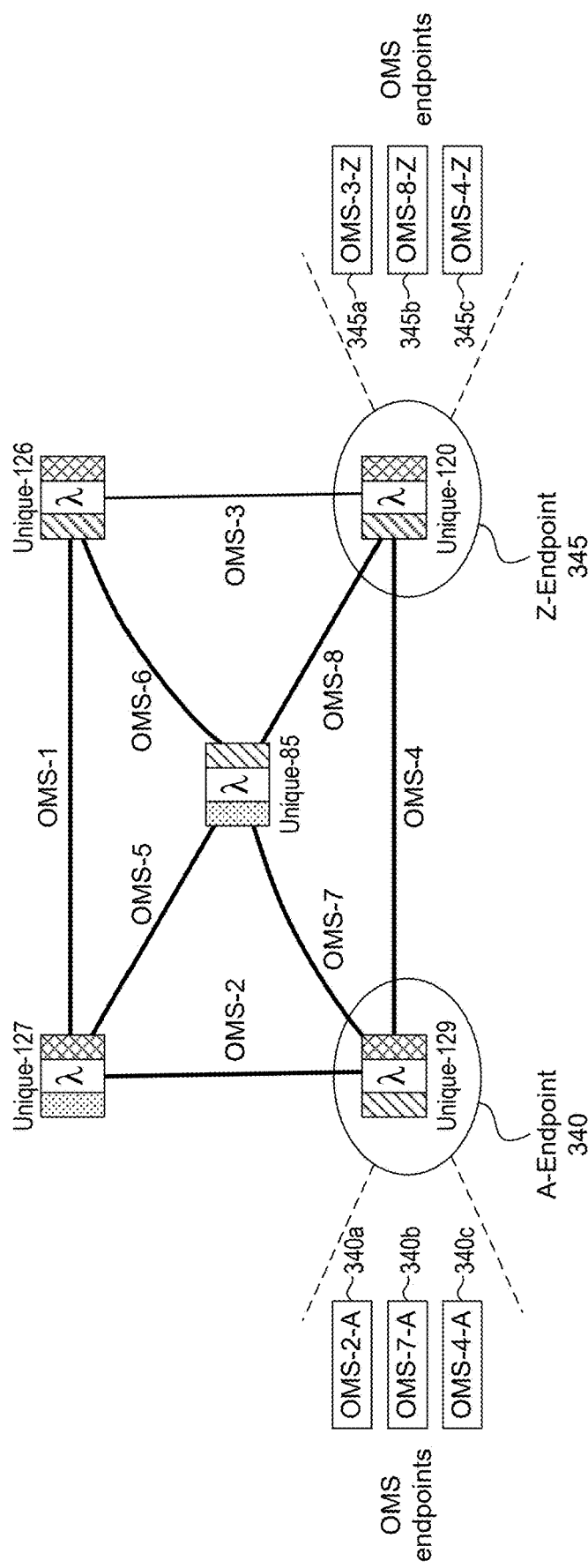
FIG. 3 illustrates an example of a path computation including multi-vendor, multi-generational equipment, according to some embodiments of the disclosure.

FIG. 3 illustrates example 300 of a path computation including multi-vendor, multi-generational equipment, according to some embodiments of the disclosure. As a convenience and not a limitation, FIG. 3 may be described with reference to elements from other figures in the disclosure. For example, FIG. 3 can illustrate at a high level, interactions between controller 110 and inventory database 120 of FIG. 1 as well as a network topology view of services between A-endpoint 340 (e.g., unique-129), and Z-endpoint 345 (e.g., unique-120), where A-endpoint 340 and Z-endpoint 345 correspond to DWDM devices 140 and 145 of FIG. 1, respectively. Example 300 includes various OMSs in a multi-vendor, multi-generational network. These include OMS-1, OMS-2, OMS-3, OMS-4, OMS-5, OMS-6, OMS-7, and OMS-8.

Controller 110 can access inventory database 120 to determine paths or routes along the various OMSs that support a given frequency width between A-Endpoint 340 and Z-Endpoint 345, where A-Endpoint 340 and/or Z-Endpoint 345 can be a single NE or a group of NEs in a geographical region (e.g., a data center identified by a CLLI code prefix).

In some embodiments, controller 110 can receive input(s) identifying features of a path to be computed (e.g., determined) based on service hierarchies in inventory database 120:

Frequency width (FW)—see Table 2 above;
A-Endpoint: OMS Endpoint List within one NE OR Grouped NEs within a geographical area
Z-Endpoint: OMS Endpoint List within one NE OR Grouped NEs within a geographical area Controller 110 can receive other inputs regarding the path to be computed based on service hierarchies in inventory database 120:

Center frequency (CF)—see Table 2 above;
Path finding criteria: Shortest hops (e.g., fewest OMSs) OR shortest distance (e.g., least geolocation distance from A-Endpoint to Z-Endpoint);
NE Include list: Include only paths between A-Endpoint and Z-Endpoint that contain the NEs in the Include list;
NE Exclude list: Exclude paths between A-Endpoint and Z-Endpoint that contain any of the NEs on the Exclude list; and
Number of Paths to return: Maximum number paths to be identified by controller 110 accessing inventory database 120.

As shown in example 300, controller 110 can identify 3 OMS endpoints at A-endpoint 340: OMS-2-A 340*a*, OMS-7-A 340*b*, and OMS-4-A 340*c*. In some examples, the OMS endpoints correspond to degrees or edges of a DWDM device. Controller 110 can identify 3 OMS endpoints (e.g., 3 degrees, or 3 edges) at Z-endpoint 345: OMS-3-Z 345*a*, OMS-8-Z 345*b*, and OMS-4-Z 345*c*.

Figure 4:
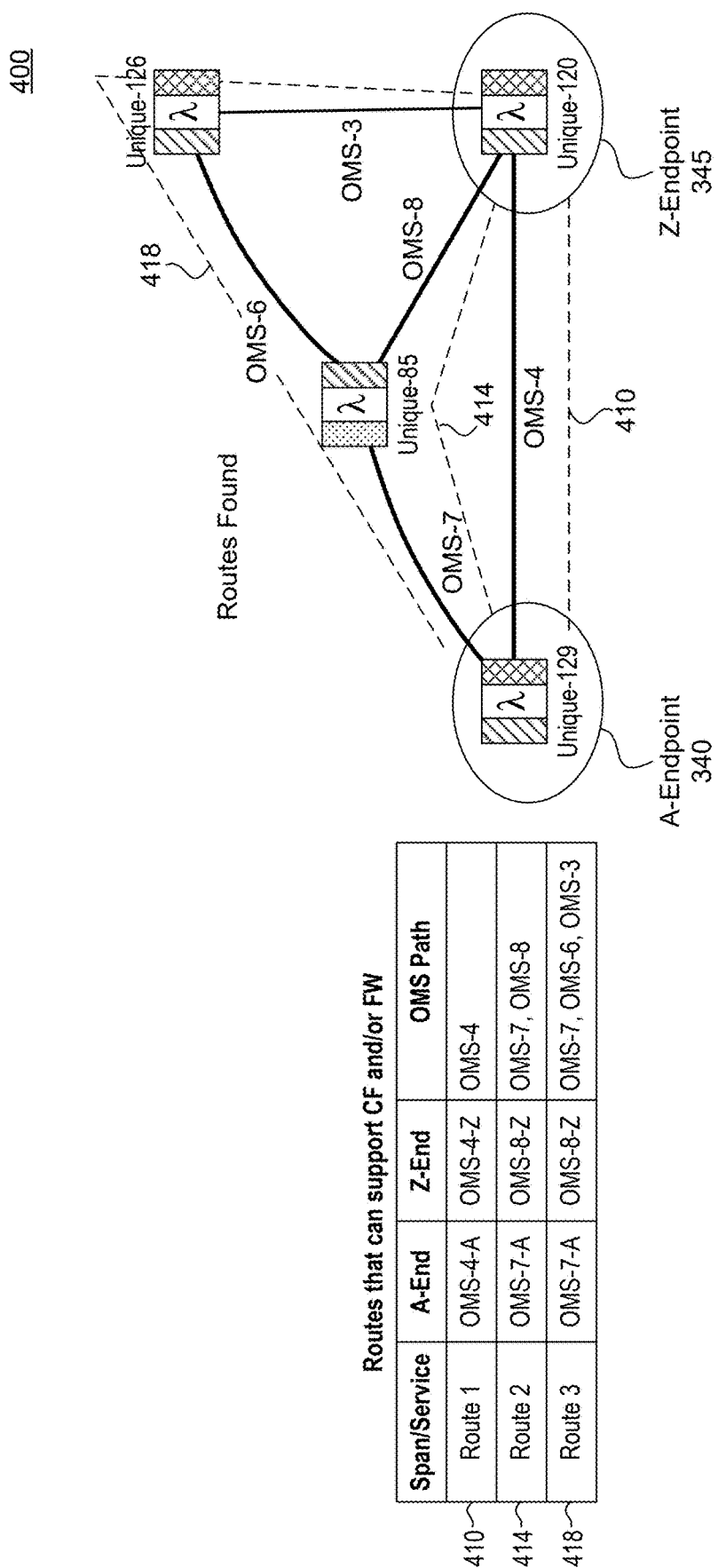
FIG. 4 illustrates an example of optical multiplex section (OMS) routes in a path computation including multi-vendor, multi-generational equipment, according to some embodiments of the disclosure.

FIG. 4 illustrates example 400 of OMS routes in a path computation including multi-vendor, multi-generational equipment, according to some embodiments of the disclosure. As a convenience and not a limitation, FIG. 4 may be described with reference to elements from other figures in the disclosure. For example, FIG. 4 can illustrate at a high level, interactions between controller 110 and inventory database 120 of FIG. 1 as well as a network topology view of services between A-endpoint 340 (e.g., unique-129), and Z-endpoint 345 (e.g., unique-120) of FIG. 3.

In some embodiments, controller 110 can determine, based on the real-time inventory data of inventory database 120, service hierarchies including intra network element topologies. Controller 110 can determine one or more paths between A-Endpoint 340 and Z-Endpoint 345 supporting a frequency width (FW), where a first path of the one or more paths includes one or more OMSs of the OTN (e.g., system 100, example 300). In example 400, three routes have been identified between A-Endpoint 340 and Z-Endpoint 345: Route 1 410, route 2 414, and route 3 418. The chart in example 400 illustrates the OMS paths for each route. In some examples, controller 110 can build an OMS graph as shown in FIG. 4.

Controller 110 can access inventory database 120 to build a graph of OMSs (e.g., edges) and associated NEs (e.g., nodes) that can support specified Center Frequency (CF) and/or (Frequency Width) FW. Controller 110 can identify a node for inclusion in an OMS graph based at least on one of the following:
  CF and FW are available in an OMS (based on spectrum availability), see Table 2; and
  OMS endpoints are not in the NE Exclude list.

In example 400, note that OMS-1, OMS-2, and OMS-5 of example 300 are not included. The CF and/or FW may not be available on OMS-1, OMS-2, and OMS-5, and/or a corresponding OMS endpoint node may be on the NE Exclude list. Accordingly, OMS-2 A-Endpoint 340a is not qualified as a candidate OMS endpoint. Controller 110 can select a set of candidate OMS A-Endpoints (e.g., 340b, 340c) and candidate OMS Z-Endpoints (e.g., 345a-345c) based on NE or geographic areas as shown in Table 4 below. Endpoints chosen can refer to endpoints that qualify based on OMS routing parameters (CF, FW etc.)

TABLE 4

Endpoints Chosen

| A-End | Z-End |
| --- | --- |
| Unique-129 OMS-7-A | Unique-120 OMS-3-Z |
| Unique-129 OMS-4-A | Unique-120 OMS-8-Z |
|  | Unique-120 OMS-4-Z |

Controller 110 can determine a Cartesian product of possible ordered pairs as shown in Table 5 below. For example, controller 110 can apply a Yen's algorithm to each ordered pair to find the lowest cost routes amongst all the routes possible between ordered pairs until the maximum number paths (or the maximum number of paths stipulated to be found) are determined.

TABLE 5

Ordered Pairs

| A-End | Z-End |
| --- | --- |
| Unique-129 OMS-7-A | Unique-120 OMS-3-Z |
| Unique-129 OMS-4-A | Unique-120 OMS-3-Z |
| Unique-129 OMS-7-A | Unique-120 OMS-8-Z |
| Unique-129 OMS-4-A | Unique-120 OMS-8-Z |
| Unique-129 OMS-7-A | Unique-120 OMS-4-Z |
| Unique-129 OMS-4-A | Unique-120 OMS-4-Z |

An example of pseudo code for tracking the ordered pairs is shown below:

```
Let w = all A-End/Z-End ordered pairs
# pop( ) - get Yen execution on ordered pair with lowest cost
While let y = w.pop( ) and n < N
    Let p = y.next( )
    If meets_criteria(p) # is in include list
        Save (p)
        n = n + 1
w - minimum heap of Yen executions (e.g., the Yen execution
    that found the path with the least cost, by hops or distance,
    is at the root of the heap)
y - instance of Yen execution on an ordered pair
p - path
n - number of paths found
N - Maximum paths from input
```

For example, using a modified Yen's algorithm with a shortest path algorithm, controller 110 can determine the best path and then determine deviations of the best path as shown in example 400 of FIG. 4.

Figure 5:
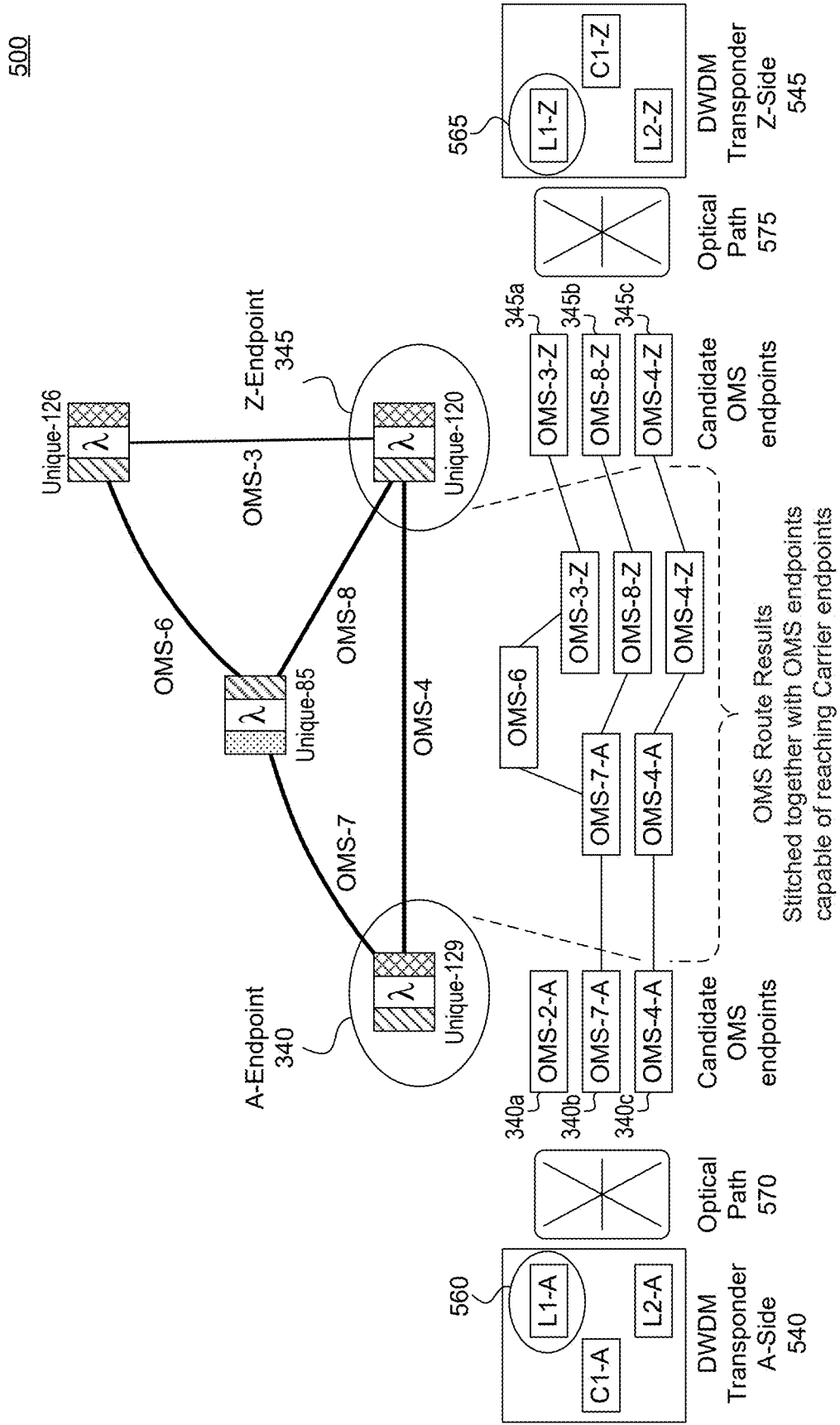
FIG. 5 illustrates an example of carrier service path computation including multi-vendor, multi-generational equipment, according to some embodiments of the disclosure.

FIG. 5 illustrates example 500 of carrier service path computation including multi-vendor, multi-generational equipment, according to some embodiments of the disclosure. As a convenience and not a limitation, FIG. 5 may be described with reference to elements from other figures in the disclosure. For example, FIG. 5 can illustrate at a high level, interactions between controller 110 and inventory database 120 of FIG. 1 and utilizing a network topology view of services between A-endpoint 340 (e.g., unique-129), and Z-endpoint 345 (e.g., unique-120) of FIG. 4.

Example 500 includes OMS endpoints (e.g., candidate OMS endpoints 340a-340c, 345a-345c) that start or end on an NE. One OMS endpoint corresponds to one degree or edge. Example 500 can include DWDM transponder 540 on the A-side and DWDM transponder 545 on the Z-side, where carrier service endpoints reside on line-side endpoint L1-A 560 and line-side endpoint L1-Z 565, respectively. Optical paths 570 and 575 can include optical adjacencies and/or xcons for an intra or inter topology fiber path between a DWDM transponder and candidate OMS endpoints (e.g., between DWDM transponder 540 and candidate OMS endpoints 340b, 340c; or between DWDM transponder 545 and candidate OMS endpoints 345a, 345b, 345c). Recall that OMS endpoint OMS-2-A 340a was not included as described in example 400 of FIG. 4.

As described in example 400, controller 110 can determine the OMS routes that satisfy the specified FW and/or CF. Example 500 illustrates controller 110 using the determined OMS routes and inventory database 120 to determine one or more carrier routes between carrier endpoint L1-A 560 and carrier endpoint L1-Z 565. In some examples, controller 110 can receive as input, carrier endpoint L1-A 560 as the A-endpoint and carrier endpoint L1-Z 565 as the Z-endpoint. Controller 110 can stitch together the OMS endpoints that are capable of reaching the carrier endpoint L1-A 560 and carrier endpoint L1-Z 565. For example, controller 110 can stitch together a carrier path starting at carrier endpoint L1-A 560 along OMS route 3 418 of example 400, including OMS-7-A 340b to OMS-6 to OMS-3-Z 345a, ending at carrier endpoint L1-Z 565.

FIG. 6A illustrates example 600 of carrier service path computation including carrier endpoint 560 and OMS endpoints 340a-340c co-located on NE 610, according to some embodiments of the disclosure. As a convenience and not a limitation, FIG. 6A may be described with reference to elements from other figures in the disclosure. For example, FIG. 6A can illustrate at a high level, interactions between controller 110 and inventory database 120 of FIG. 1, and includes DWDM transponder 540 including carrier endpoint 560, optical path 570, and candidate OMS endpoints 340a-340c of FIG. 5.

In example 600, a DWDM transponder (e.g., DWDM transponder 540) is co-located on a NE (e.g., NE 610) with candidate OMS endpoints (e.g., candidate OMS endpoints 340a-340c). To determine the carrier service path starting at L1-A 560, controller 110 can perform the following:

Find candidate OMS endpoints (e.g., candidate OMS endpoints 340a-340c) for a specified carrier endpoint (e.g., L1-A 560). For example, when the carrier endpoint and the OMS endpoints are co-located on the same NE (e.g., NE 610), access a list of OMS endpoints (e.g., candidate OMS endpoints 340a-340c) that are on same NE (e.g., NE 610);

For each OMS endpoint (e.g., candidate OMS endpoints 340a-340c) on A-Endpoint:
Run a Depth First Search algorithm along an optical path (e.g., optical path 570) from OMS endpoint (e.g., candidate OMS endpoints 340a-340c) to carrier endpoint (e.g., L1-A 560);
Save the route corresponding to the path on optical path 570 (e.g., various cards) for each of the OMS endpoints 340a-340c that can reach L1-A 560.

Repeat the above steps on Z-end corresponding to carrier endpoint (e.g., L1-Z 565) and OMS endpoints (e.g., candidate OMS endpoints 345a-345c).

Find candidate OMS endpoints (e.g., candidate OMS endpoints 345a-345c) for a specified carrier endpoint (e.g., L1-Z 565). For example, when the carrier endpoint and the OMS endpoints are co-located on the same NE, access a list of OMS endpoints (e.g., candidate OMS endpoints 345a-345c) that are on the same NE;

For each OMS endpoint (e.g., candidate OMS endpoints 345a-345c) on Z-Endpoint:
Run a Depth First Search algorithm along an optical path (e.g., optical path 575) from OMS endpoint (e.g., candidate OMS endpoints 345a-345c) to carrier endpoint (e.g., L1-Z 565);
Save the route corresponding to the path on optical path 575 (e.g., various cards) for each of the OMS endpoints 345a-345c that can reach L1-Z 565.

If the carrier endpoint L1-A 560 is reachable by 340a, 340b, and/or 340c, and if L1-Z 565 is reachable by 345a, 345b, and/or 345c, then invoke OMS routing. For any OMS route found between L1-A 560 and L1-Z 565, save the corresponding Routes (e.g., route 1 410, route 2, 414, and route 3 418 of FIG. 4) based on the OMS endpoints (e.g., candidate OMS endpoints 340b and 340c as well as OMS endpoints 345a-345c).

FIG. 6B illustrates example 650 of carrier service path computation where carrier endpoint 560 and OMS endpoints 340a-340c that are not located on a same NE, according to some embodiments of the disclosure. As a convenience and not a limitation, FIG. 6B may be described with reference to elements from other figures in the disclosure. For example, FIG. 6B can illustrate at a high level, interactions between controller 110 and inventory database 120 of FIG. 1, and includes DWDM transponder 540 including carrier endpoint 560, optical path 570, and candidate OMS endpoints 340a-340c of FIG. 5.

In example 650, a DWDM transponder (e.g., DWDM transponder 540) is located on NE 620 and candidate OMS endpoints (e.g., candidate OMS endpoints 340a-340c) are located on a different NE (e.g., NE 630). The NEs can be communicatively connected via optical path 570. To determine the carrier service path starting at L1-A 560, controller 110 can perform the following:

Run a Depth First Search algorithm along an optical path (e.g., optical path 570) from the carrier endpoint (e.g., L1-A 560) to a reachable OMS endpoint (e.g., candidate OMS endpoints 340a-340c);
Save the route corresponding to the path on optical path 570 (e.g., various cards) for each of the OMS endpoints 340a-340c that can reach L1-A 560.
Run a Depth First Search algorithm along an optical path (e.g., optical path 575) from OMS endpoint (e.g., candidate OMS endpoints 345a-345c) to carrier endpoint (e.g., L1-Z 565);
Save the route corresponding to the path on optical path 575 (e.g., various cards) for each of the OMS endpoints 345a-345c that can reach L1-Z 565.
If the carrier endpoint L1-A 560 is reachable by 340a, 340b, and/or 340c, and if L1-Z 565 is reachable by 345a, 345b, and/or 345c, then invoke OMS routing. If L1-A 560 and L1-Z 565 are reachable, save the corresponding Routes (e.g., route 1 410, route 2, 414, and route 3 418 of FIG. 4) based on the OMS endpoints (e.g., candidate OMS endpoints 340b and 340c as well as OMS endpoints 345a-345c).

Figure 7:
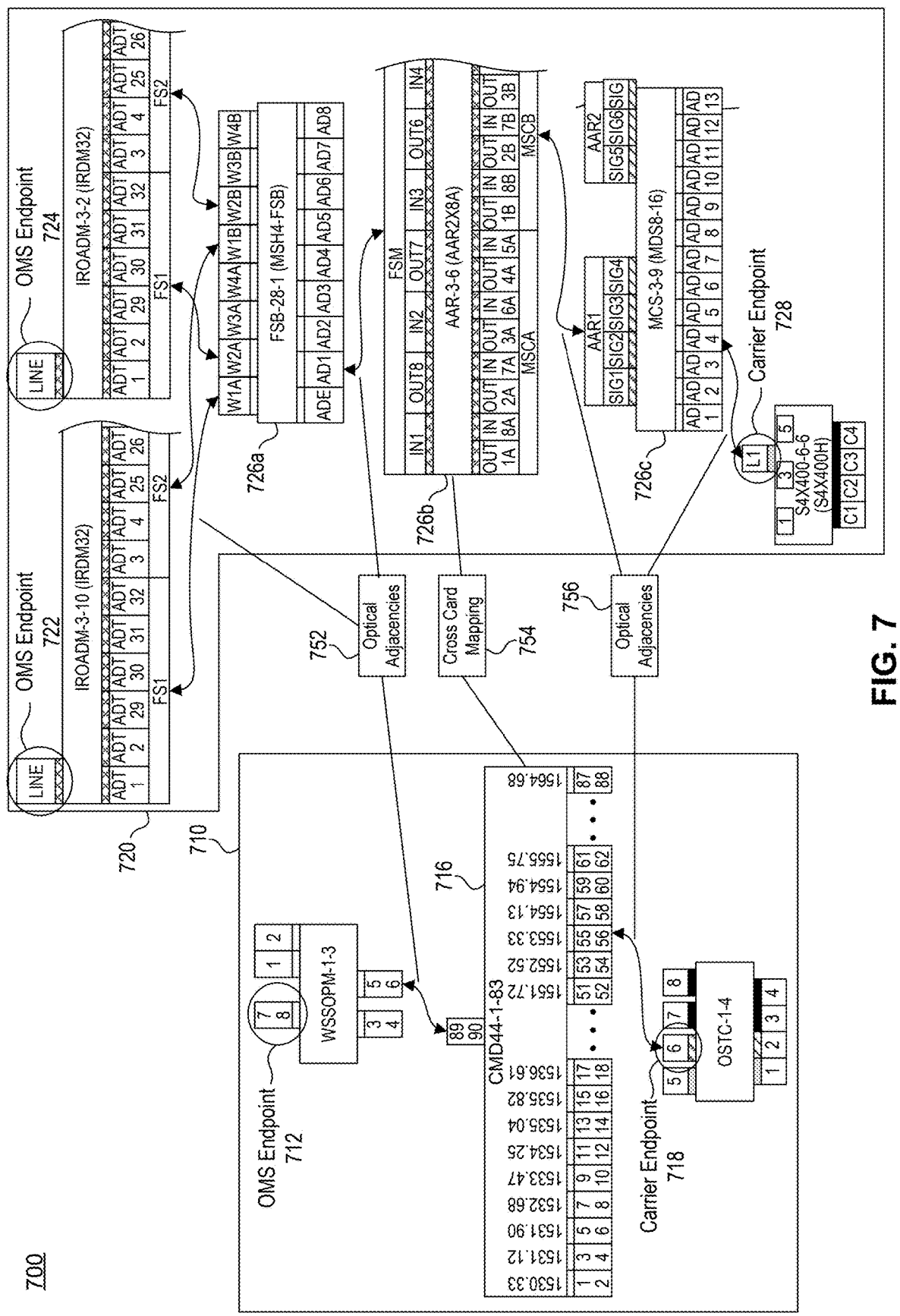
FIG. 7 illustrates an example of optical path variations with carrier endpoint and OMS endpoint co-location, according to some embodiments of the disclosure.

FIG. 7 illustrates example 700 of optical path variations with carrier endpoint and OMS endpoint co-location, according to some embodiments of the disclosure. As a convenience and not a limitation, FIG. 7 may be described with reference to elements from other figures in the disclosure. For example, NE 710 and/or NE 720 can be nodes communicatively coupled to network 150 of FIG. 1. In another example, NE 710 and/or NE 720 can be NE 610 of FIG. 6A. Example 700 illustrates two NEs (e.g., NE 710 and NE 720) that include different vendor equipment in a multi-vendor, multi-generational network (e.g., system 100, example 300). NE 710 and NE 720 have different optical path topologies between carrier endpoints and OMS endpoints that can include optical adjacencies 752 between neighboring devices, different xcons (e.g., cross card mappings 754), and optical adjacencies 756 between different neighboring equipment.

NE 710 illustrates a fixed grid example where there is only one possible reachable OMS endpoint, OMS endpoint 712, exists. In other words, OMS endpoint 712 is an example of a directional, one siloed degree topology. Thus, a carrier service route from carrier endpoint 718 on a transponder traverses an optical adjacency to device 716 which could be a multiplexer/demultiplexer, takes an xcon across device 716 to another optical adjacency along with another xcon to OMS endpoint 712. In an example, carrier endpoint 718 can be carrier endpoint L1-A 560 and OMS endpoint 712 can be one of OMS endpoints 340a-340c that can reach L1-A 560. In another example, carrier endpoint 718 can be carrier endpoint L1-Z 565 and OMS endpoint 712 can be one of OMS endpoints 345a-345c that can reach L1-Z 565.

NE 720 illustrates a flexgrid example of two possible OMS endpoints or degrees (e.g., OMS endpoint 722 and OMS endpoint 724) for a carrier endpoint (e.g., carrier endpoint 728). In other words, OMS endpoint 722 and OMS endpoint 724 are examples of a directionless, two degree topology. Thus, a carrier service route from carrier endpoint 728 on a transponder traverses an optical adjacency to device 726c which could be an optical switch, takes an xcon across device 726c to another optical adjacency along with another xcon across device 726b, takes an optical adjacency path to neighboring device 726a, and takes an xcon across device 726a. The carrier service route continues with an optical adjacency to one of the two ROADM devices with an xcon to reach either OMS endpoint 722 or OMS endpoint 724. In an example, carrier endpoint 728 can be carrier endpoint L1-A 560, OMS endpoint 722 can be OMS endpoint 340a, 340b, or 340c, and OMS endpoint 724 can be the remaining OMS endpoint 340a, 340b, or 340c that can reach L1-A 560. In another example, carrier endpoint 728 can be carrier endpoint LZ-A 565, OMS endpoint 722 can be one of OMS endpoints 345a-345c, and OMS endpoint 724 can be one of the remaining OMS endpoints 345a-345c that can reach L1-Z 565.

Figure 8:
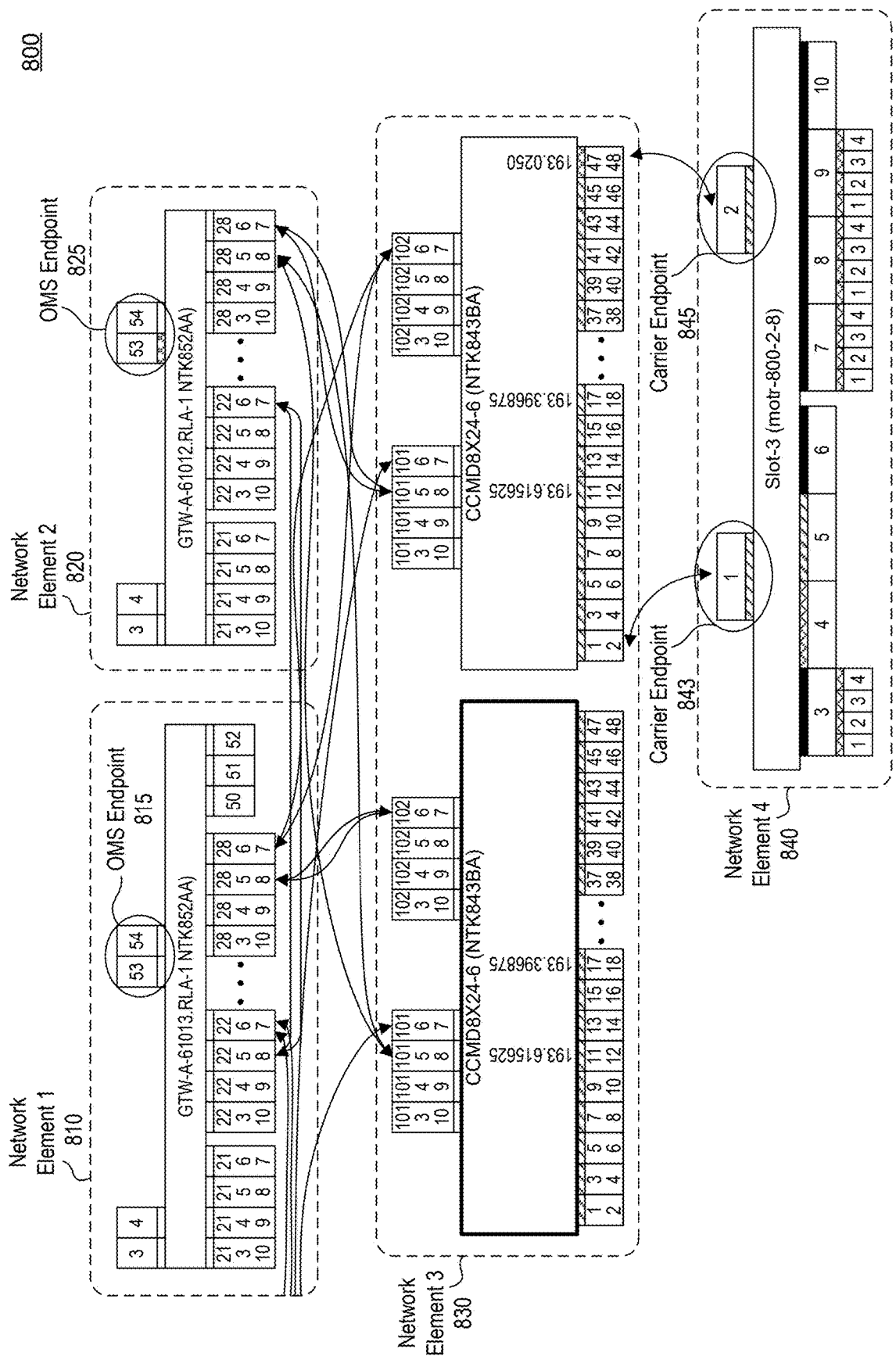
FIG. 8 illustrates an example of optical path variations where carrier and OMS endpoints are not on a same NE, according to some embodiments of the disclosure.

FIG. 8 illustrates example 800 of optical path variations where carrier and OMS endpoints are not on a same NE, according to some embodiments of the disclosure. As a convenience and not a limitation, FIG. 8 may be described with reference to elements from other figures in the disclosure. For example, NE 1 810 and/or NE 2 820 can be nodes communicatively coupled to network 150 of FIG. 1. Example 800 illustrates four NEs (e.g., NE 1 810, NE 2 820, NE 3 830 and NE 4 840) that include different vendor equipment in a multi-vendor, multi-generational network (e.g., system 100, example 300). Example 800 can correspond to example 650 of FIG. 6B.

Example 800 illustrates that OMS endpoints 815 and OMS endpoint 825 are located on different NEs, namely NE 1 810 and NE 2 820, respectively. Further, carrier endpoints 843 and carrier endpoint 845 can be located on NE 4 840. Thus, many different types of optical paths (e.g., optical adjacencies and xcons) can occur between carrier endpoints and OMS endpoints on different NEs. In an example, carrier endpoint 843 or 845 can be carrier endpoint L1-A 560, OMS endpoint 815 and OMS endpoint 825 can represent two of the three OMS endpoints 340a, 340b, or 340c, that can reach L1-A 560. In another example, carrier endpoint 843 or 845 can be carrier endpoint LZ-A 565, OMS endpoint 815 can be one of OMS endpoints 345a-345c, and OMS endpoint 825 can be one of the remaining OMS endpoints 345a-345c that can reach L1-Z 565.

In some embodiments, the corresponding Routes can include multi-vendor and multi-generational equipment. For example, optical path 570 and/or optical path 575 of FIG. 5 can include optical paths as described in examples 700 and/or 800, where example 700 is based on vendor A equipment (e.g., Nokia) and example 800 is based on different vendor equipment, such as vendor B equipment (e.g., Ciena).

Figure 9A:
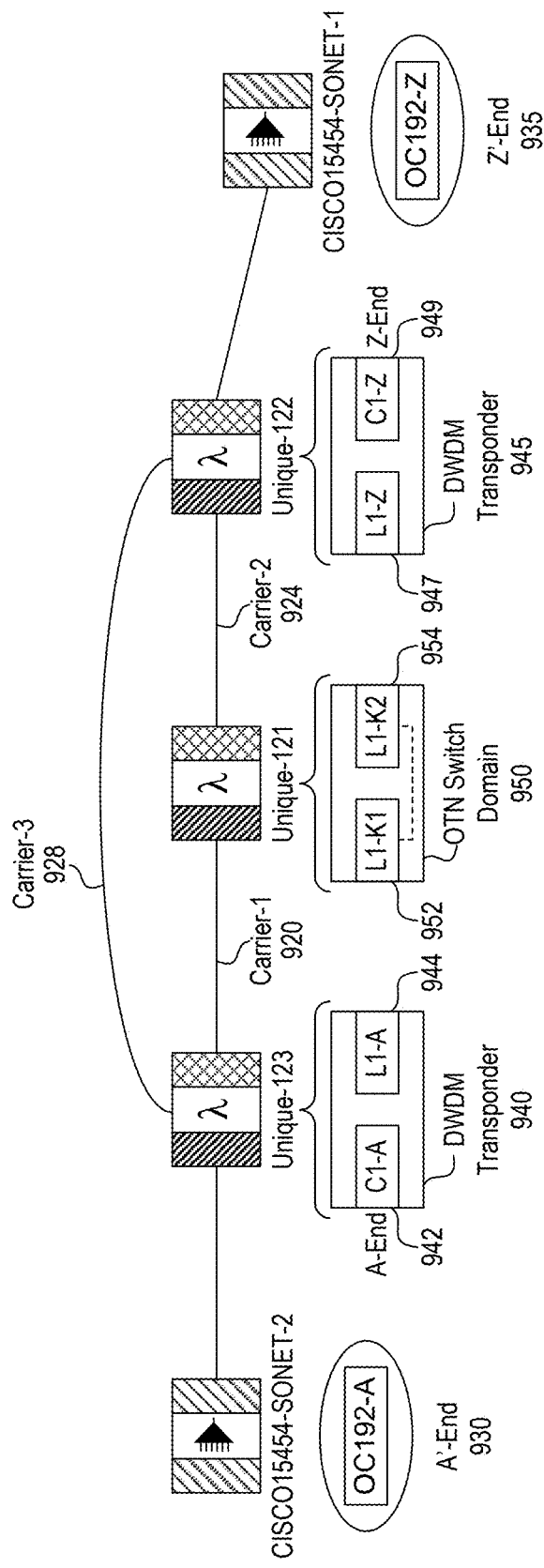
FIG. 9A illustrates an example of client service path computation including multi-vendor and multi-generational equipment, according to some embodiments of the disclosure.

FIG. 9A illustrates example 900 of client service path computation including multi-vendor and multi-generational equipment, according to some embodiments of the disclosure. As a convenience and not a limitation, FIG. 9A may be described with reference to elements from other figures in the disclosure. For example, FIG. 9A can illustrate at a high level, interactions between controller 110 and inventory database 120 of FIG. 1, and includes DWDM transponder 940 and DWDM transponder 945 that can correspond to DWDM transponder 540 and DWDM transponder 545 of FIG. 5. Example 900 can include a client service endpoint, A'-End 930 (e.g., SONET edge node OC192-A) and a client service endpoint, Z'-End 935 (e.g., SONET edge node OC192-Z) that are onboarded to a multi-vendor, multi-generational DWDM network. Example 900 also includes OTN switch domain 950 and three carriers: carrier-1 920, carrier-2 924, and carrier-3 928. Example 900 illustrates client service path computation functions with SONET edge nodes and ODU timeslot switching. In other words, example 900 shows how controller 110 can route a client service over multiple carriers and switch timeslots within an ODU container (e.g., at OTN switch domain 950).

In some examples, the following information is input and/or accessed by controller 110:
 Client service endpoint, A'-End 930 (e.g., SONET edge node OC192-A); and
 Client service endpoint, Z'-End 935 (e.g., SONET edge node OC192-Z).
 Controller 110 may also receive the following information and/or determine the following information in inventory database 120:
 A-End carrier endpoint (e.g., L1-A 944) on DWDM transponder 940—the carrier service (e.g., carrier-1 920) the client service will ride over from the A-side.
 A-End ODU timeslots-timeslots within the ODU container (e.g., at L1-A 944) that the client service is mapped to. If the A-End ODU timeslots are not input, controller 110 can select first available timeslots to carry client service payload.
 Z-End carrier endpoint (e.g., L1-Z 947) on DWDM transponder 945—the carrier service (e.g., carrier-2 924) the client service will initially ride over from the Z-side.
 Z-End ODU timeslots-timeslots within the ODU container (e.g., at L1-Z 947) that the client service is mapped to. If the Z-End ODU timeslots are not input, controller 110 can select first available timeslots to carry client service payload.

To perform client path computation, controller 110 can perform the following steps:
 Discover the corresponding DWDM Points of Presence (PoPs) corresponding to client service endpoints using inventory database 120. For example 900, controller 110 can identify the two input SONET Optical Carrier ports (e.g. OC192-A for client service A'-End 930 and OC192-Z for client service Z'-End 935) that are onboarded to a DWDM network, and using optical adjacency information in inventory database 120, determine A-end client side port C1-A 942 on DWDM transponder 940 and Z-end client side port C1-Z 949 on DWDM transponder 945, respectively.
 Determine existing carrier endpoints on the line side (e.g., L1-A 944) of DWDM transponder 940 that are reachable from the A-End client side (C1-A 942) using xcon (e.g., Cross Card Mapping) information in inventory database 120. Controller 110 also determines existing carrier endpoints on the line side (e.g., L1-Z 947) of DWDM transponder 945 that are reachable from the Z-End client side (C1-Z 949) using xcon (e.g., Cross Card Mapping) information in inventory database 120.
 Determine for each carrier leaving A-End DWDM transponder 940 check if the A-End and Z-End carrier endpoints support a common available (e.g., unused) ODU timeslot block requested.
 If a carrier does not support a common ODU timeslot block as needed, controller 110 determines the carrier does not qualify to be included. In example 900, carrier-1 920 qualifies but carrier-3 928 does not.

When a carrier (e.g., carrier-1 920) does support a common available (e.g., unused) ODU timeslot block as needed, controller 110 determines (i) whether the carrier's Z-End (e.g., Z-end of carrier-1 920, L1-K1 952) is not on the client Z-End NE (where C1-Z 949 is located on DWDM transponder 945); and (ii) whether the carrier's Z-End, L1-K1 952 is part of a OTN switching domain (e.g., OTN switch domain 950). When both (i) and (ii) are satisfied, controller 110 can save the carrier and common available (e.g., unused) ODU timeslot choices found (e.g., carrier-1 920 ODU timeslots at L1-K1 952) at OTN switch domain 950. In example 900, L1-K1 952 is not on DWDM transponder 945 and controller 110 proceeds to a next step.

Controller 110 can determine a next reachable carrier (e.g., carrier-2 924) within OTN switching domain 950 (recursively). For example, controller 110 can continue searching inventory database 120 until the carrier's service Z-End NE (e.g., carrier-2 924's L1-Z 947) is determined to connect with at OTN switch domain 950 at e.g., L1-K2 954, where carrier-1 920's Z-End L1-K1 952 is located. Controller 110 can save the carrier and the common available (e.g., unused) ODU timeslot choices found (e.g., carrier-2 924 and corresponding ODU timeslot choices as well as carrier-1 920 and corresponding ODU timeslot choices).

Figure 9B:
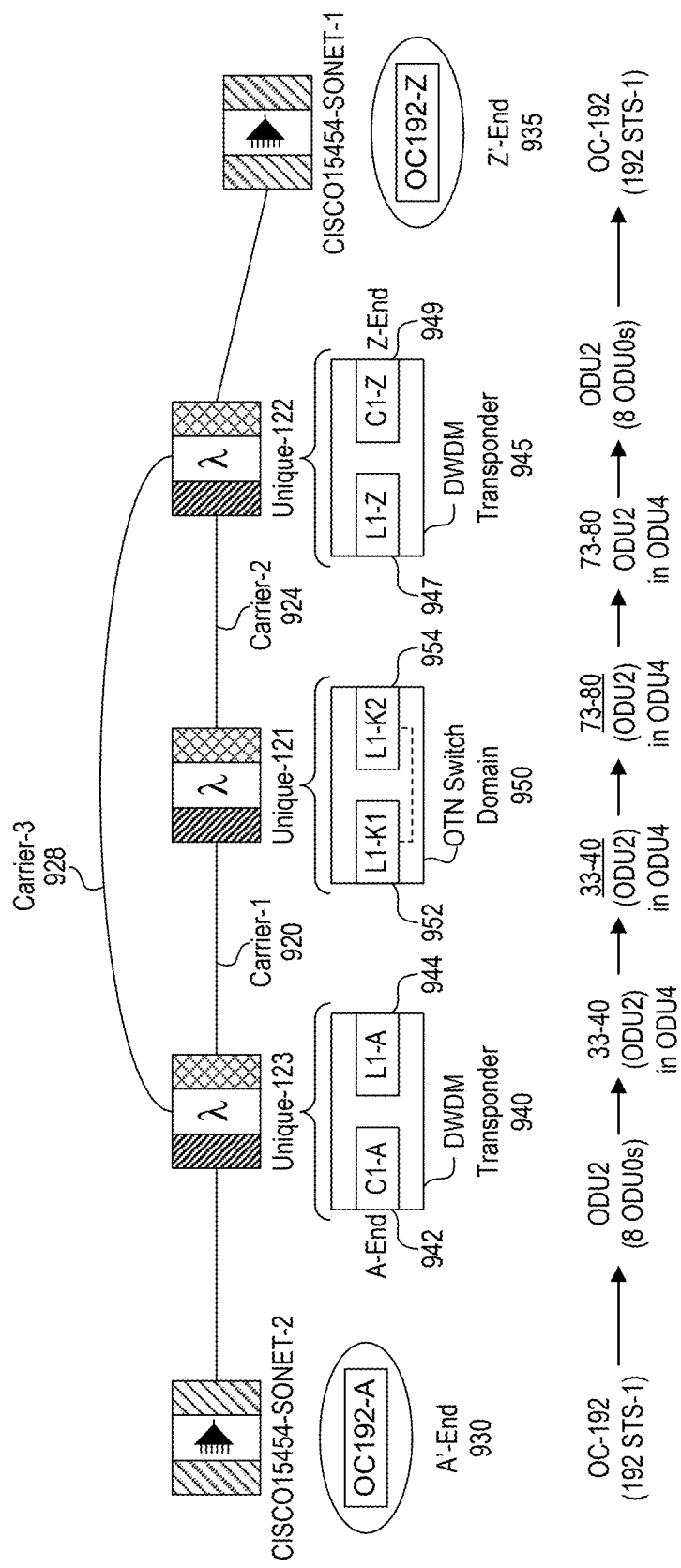
FIG. 9B illustrates an example of client service path computation with ODU timeslot switching including multi-vendor and multi-generational equipment, according to some embodiments of the disclosure.

FIG. 9B illustrates example 960 of client service path computation with ODU timeslot switching including multi-vendor and multi-generational equipment, according to some embodiments of the disclosure. As a convenience and not a limitation, FIG. 9B may be described with reference to elements from other figures in the disclosure. For example, FIG. 9B can illustrate at a high level, interactions between controller 110 and inventory database 120 of FIG. 1. FIG. 9B also includes DWDM transponder 940, DWDM transponder 945, client service endpoint A'-End 930, client service endpoint Z'-End 935, OTN switch domain 950 and three carriers: carrier-1 920, carrier-2 924, and carrier-3 928 of FIG. 9A.

Some embodiments include determining a client-level route via a first path, where at least one of the A-End (e.g., DWDM transponder 940) or the Z-End (e.g., DWDM transponder 945) provides a point of presence (POP) for a client service to an obsolete equipment (e.g., A'-End 930, Z'-End 935, respectively) of a multi-vendor, multi-generational network. Some embodiments enable tracking SONET traffic at the STS-1 rate from obsolete equipment (e.g., multi-generational equipment) within multi-vendor DWDM networks.

Example 960 illustrates that a client service path computation allows ODU0 (e.g., containing STS-1) timeslots (TSs) to be switched where two carriers are interconnected at a NE endpoint with OTN switching capabilities (e.g., OTN switch domain 950). Example 960 shows that A'-End 930, a SONET optical carrier device OC-192, includes 192 STS-1 TSs that can be tracked along the computed client paths shown in example 960. The 192 STS-1 TSs can be multiplexed into an ODU2 signal operating at 10 GBps rates to C1-A 942 of DWDM transponder 940, a PoP for A'-End 930 on the DWDM network. (See Table 3 above.) The ODU2 signal can be multiplexed up to an ODU4 signal at a reachable carrier endpoint (e.g., L1-A 944) where STS-1 TSs can be transported in ODU0 TS#33-40 blocks within the ODU2 signal. At L1-K1 952, controller 110 determines that ODU0 TSs#33-40 are not available on carrier-2 924, but the STS-1 TSs can be switched to ODU0 TS#73-80 for transport across carrier-2 924. At DWDM transponder 945, the signals are demultiplexed down to the ODU2 rate where C1-Z 949 provides a PoP for Z'-End 935. The STS-1 TSs are received at Z'-End 935.

Figure 11:
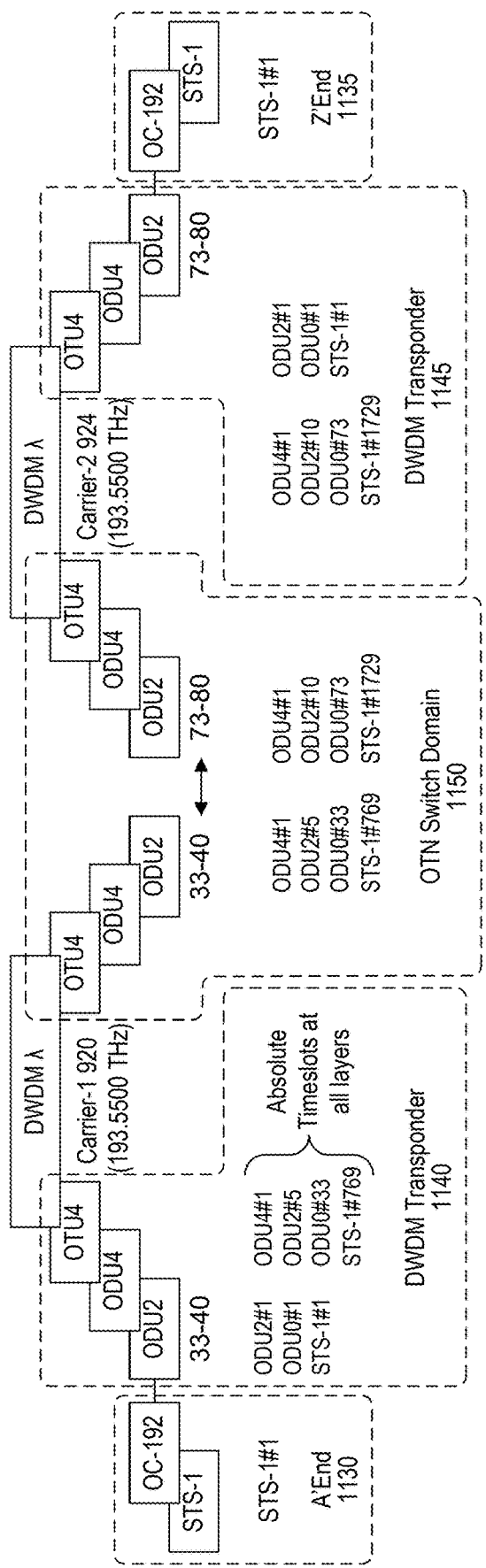
FIG. 11 illustrates examples of trace computation with ODU timeslot switching, according to some embodiments of the disclosure.

FIG. 11 illustrates example 1100 of trace computation with ODU timeslot switching, according to some embodiments of the disclosure. As a convenience and not a limitation, FIG. 11 may be described with reference to elements from other figures in the disclosure. For example, FIG. 11 can illustrate at a high level, interactions between controller 110 and inventory database 120 of FIG. 1. FIG. 11 also includes DWDM transponder 1140, DWDM transponder 1145, client service endpoint A'-End 1130, client service endpoint Z'-End 1135, OTN switch domain 1150, carrier-1 920, and carrier-2 924 which can correspond to DWDM transponder 940, DWDM transponder 945, client service endpoint A'-End 930, client service endpoint Z'-End 935, OTN switch domain 950, carrier-1 920, and carrier-2 924 of FIG. 9A.

Example 1100 illustrates a trace computation to verify a path that has been computed by controller 110. Example 1100 shows that A'-End 1130, a SONET optical carrier device OC-192, includes STS-1#1 TS of the 192 STS-1 TSs that can be tracked along a computed client path. Relative timeslots at every layer are tracked along with the absolute timeslot at highest layer. The 192 STS-1 TSs including STS-1#1 can be received at DWDM transponder 1140 (e.g., C1-A 942 of FIG. 9B) in ODU0#1 TS within ODU2#1. The 192 STS-1 TSs including STS-1#1 can be multiplexed with other signals and carried in the absolute time slots. For example, the STS-1#1 TS can correspond to STS-1#769 TS within ODU0#33 TS of ODU2#5 within ODU4#1 (at a reachable carrier endpoint (e.g., L1-A 944 of FIG. 9B) that are transported across carrier-1 920 to OTN switch domain 1150. Likewise, the 192 STS-1 TSs can be transported across carrier-1 920 to OTN switch domain 1150 in ODU0 TS#33-40 blocks within the ODU2#5 TS.

At L1-K1 952 of FIG. 9B, controller 110 determines that TSs#33-40 are not available on carrier-2 924, and the 192 STS-1 TSs including STS-1#1 are switched to ODU0 TS#73-80 blocks for transport across carrier-2 924. The STS-1#1 TS can now correspond to STS-1#1729 TS within ODU0#73 TS of ODU2#10 within ODU4#1 (at a reachable carrier endpoint (e.g., L1-K2 954 of FIG. 9B) that are transported across carrier-2 924 to DWDM transponder 1145 (e.g., L1-Z 947 of FIG. 9B). At DWDM transponder 1145, the signals are demultiplexed down to the ODU2 rate and back to STS-1#1 TS in ODU0#1 TS in ODU2#1 TS (e.g., at C1-Z 949 of FIG. 9B). The 192 STS-1 TSs are received at client service endpoint Z'-End 1135.

Figure 10A:
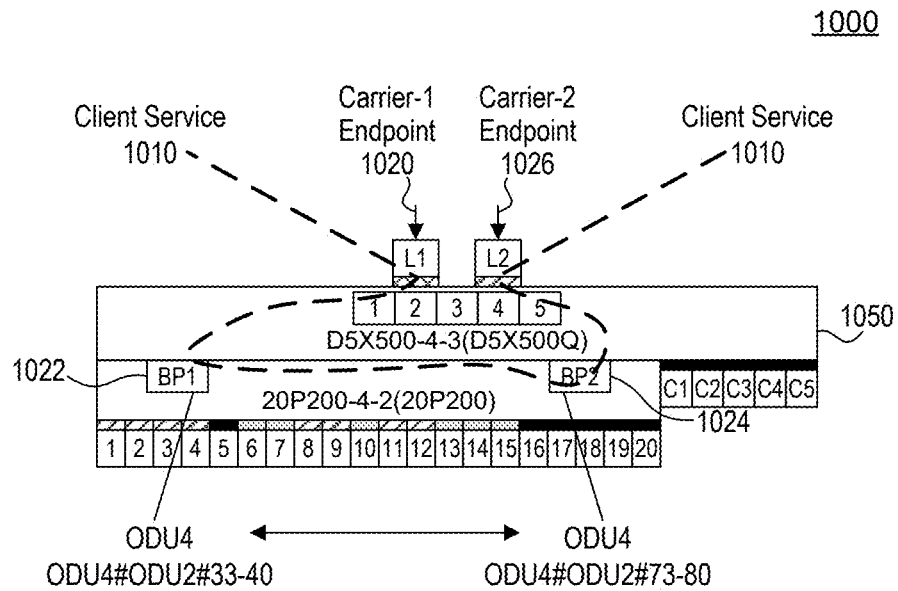
FIGS. 10A and 10B illustrate examples of client service path computations with optical data unit (ODU) time slot switching with different vendor equipment, according to some embodiments of the disclosure.
Figure 10B:
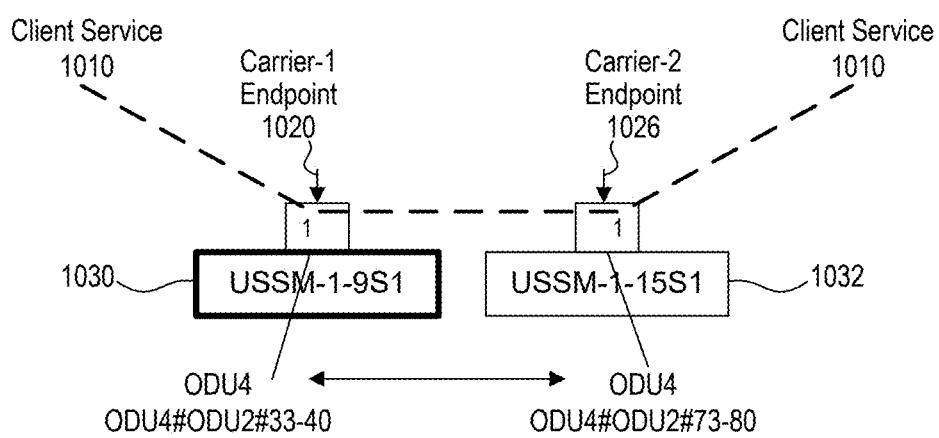

FIGS. 10A and 10B illustrate examples 1000 and 1060 of client service path computations with ODU time slot switching with different vendor equipment, according to some embodiments of the disclosure. As a convenience and not a limitation, FIGS. 10A and 10B may be described with reference to elements from other figures in the disclosure. For example, FIGS. 10A and 10B can illustrate at a high level, interactions between controller 110 and inventory database 120 of FIG. 1. Further, FIGS. 10A and 10B illustrate determining NE components capable of ODU timeslot switching with different vendor equipment, where examples 1000 and 1060 can correspond to OTN switch domain 950 of FIG. 9A, and where carrier-1 endpoint 1020 and carrier-2 endpoint 1026 can correspond to L1-K1 952 and L1-K2 954 of FIG. 9A, respectively.

Example 1000 illustrates NE 1050 (e.g., OTN switch fabric) provided by a vendor where client service path 1010 traversing carrier-1 is received at carrier-1 endpoint 1020 on a line side (e.g., at L1-K1 952). Client service path 1010 can be dropped from carrier-1 and be regroomed or assigned to a different set of timeslots needed to be sent on a different carrier like carrier-2 (e.g., at L1-K2 954). (See Tables 2 and 3 above regarding examples of ODU bandwidth and STS-1 bandwidth.) Controller 110 can access inventory database 120 to determine the amount of ODU connection bandwidth for carriers on NE 1050. Further, controller 110 uses the substructure of a port (e.g., line ports carrier-1 endpoint 1020 and carrier-2 endpoint 1026) to assign timeslots accordingly. For example, client service path 1010 is received in an ODU4 signal that is groomed to a substructure like ODU2 to utilize ODU2 timeslots#33-40 at backplane port 1 (BP1) 1022. Carrier-2 endpoint 1026 may not have ODU2 timeslots#33-40 available, so controller 110 can determine that client service path 1010 may be cross connected (e.g., switched) to ODU2 timeslots#73-80 at BP2 1024. Thus, client service path 1010 is transmitted at carrier-2 endpoint 1026 on the line side to traverse carrier-2. The reverse direction is also possible.

Example 1060 illustrates an example where line card ports can be substructured and cross connected with different time slots. For example, client service path 1010 traversing carrier-1 is received on NE 1030 at carrier-1 endpoint 1020 on a line side card. Client service path 1010 can be received in an ODU4 signal that utilizes ODU2 timeslots#33-40. Controller 110 can determine using inventory database 120 that carrier-2 endpoint 1026 may not have ODU2 timeslots#33-40 available, so client service path 1010 may be cross connected (e.g., switched) to ODU2 timeslots#73-80 at NE 1032 line side card at carrier-2 endpoint 1026. Thus, client service path 1010 is transmitted at carrier-2 endpoint 1026 on the line side to traverse carrier-2. The reverse direction is also possible.

To perform the client service path computation with OTN switching domain, controller 110 can perform the following:
Determine an amount of ODU connection bandwidth available on a card in an NE; and
Use the potential sub-structuring options on a port (e.g., OTU4→ODU4→ODU2→ODU0) to determine potential timeslots for switching carrier service signal to another carrier.

Figure 12:
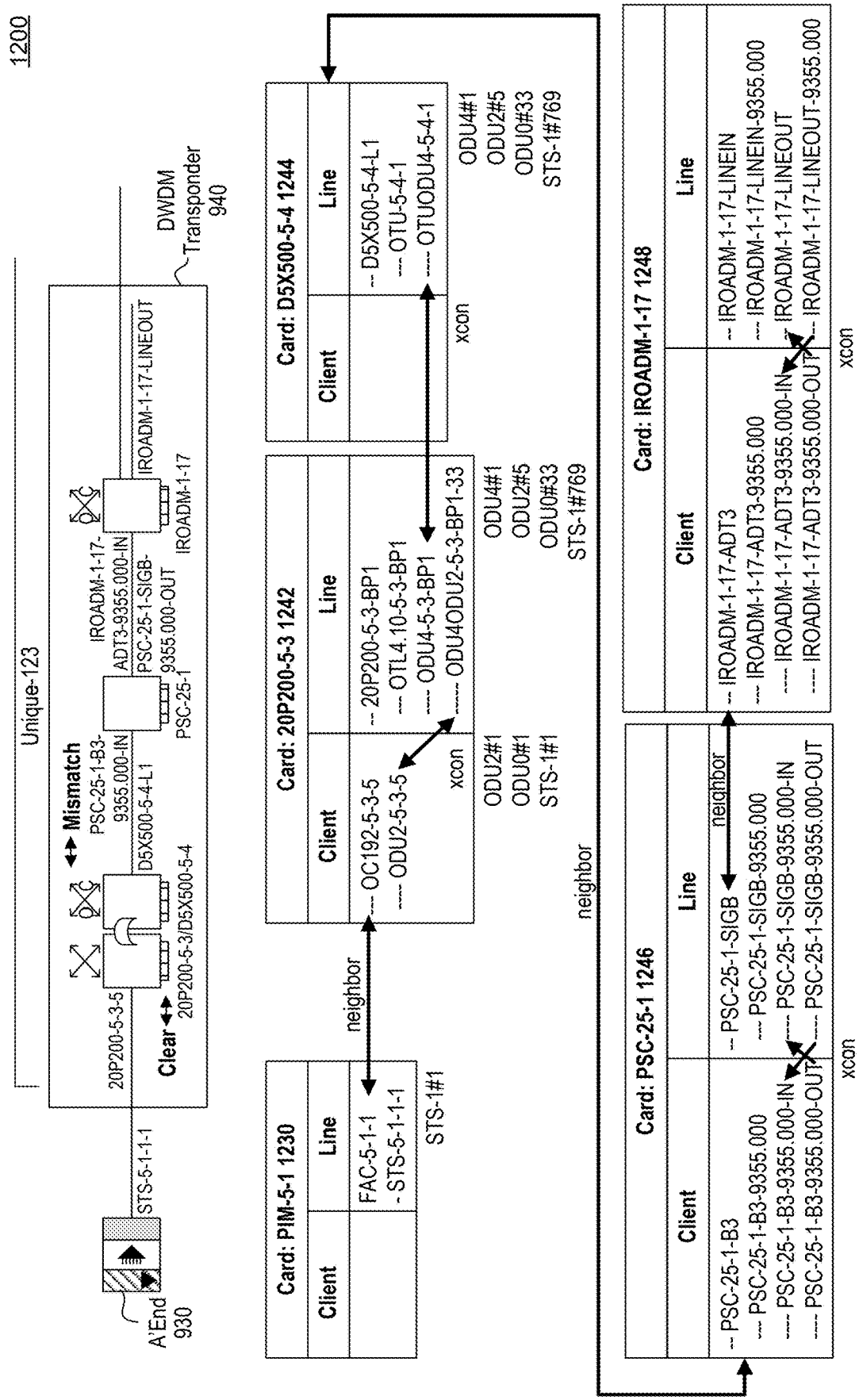
FIG. 12 illustrates an example of trace computation on a network element (NE), according to some embodiments of the disclosure.

FIG. 12 illustrates example 1200 of trace computation on a NE, according to some embodiments of the disclosure. As a convenience and not a limitation, FIG. 12 may be described with reference to elements from other figures in the disclosure. For example, FIG. 12 can illustrate at a high level, interactions between controller 110 and inventory database 120 of FIG. 1. FIG. 12 also includes client service endpoint A'-End 930 and DWDM transponder 940 of FIG. 9B.

Example 1200 illustrates an OC-192 client service trace path between two legacy SONET devices within a DWDM network (although only A'-End 930 and DWDM transponder 940 portions are shown). A'-End 930 corresponds to card 1230. DWDM transponder 940 (also referred to as Unique-123) includes 4 cards: Card 1242, card 1244, card 1246, and card 1248. A data model utilizing STS-1 timeslots and OTN layer service hierarchy can be used to facilitate tracking an STS-1 originated signal through a DWDM service path. Relative timeslots at every layer are tracked along with the absolute timeslot at highest layer.

To trace between cards of DWDM transponder 940, controller 110 verifies (e.g., walks up) a facility hierarchy to first facility with cross connect or up to physical port and follows the optical adjacency (neighbor). To trace across cards, controller 110 verifies (e.g., walks down) the facility hierarchy to Connection Termination Point (CTP) and follows cross connect (xcon) to next CTP. Controller 110 keeps track of absolute timeslots at highest layer.

Starting at card 1230 on STS-5-1-1-1 at rate STS-1, each layer's TSs are tracked along the computed path following an optical adjacency to neighboring card 1242. At card 1242, the client path is cross connected from ODU2#1 to ODU4#1ODU2#5 and further cross connected to card 1244. The client path follows an optical adjacency to a neighboring card 1246, cross connected from the client side to a line side, and follows an optical adjacency path to a neighboring card 1248.

FIGS. 13A and 13B illustrate examples 1300 and 1350 of ODU time slot switching for trace computation, according to some embodiments of the disclosure. As a convenience and not a limitation, FIGS. 13A and 13B may be described with reference to elements from other figures in the disclosure. For example, FIGS. 13A and 13B can illustrate at a high level, interactions between controller 110 and inventory database 120 of FIG. 1. FIG. 13A can correspond to DWDM transponder 1140 of FIG. 11, which is also referred to as Unique-123 (see DWDM transponder 940), and FIG. 13B can correspond to OTN switch domain 1150 of FIG. 11, which is also referred to as Unique-121 (see OTN switch domain 950). Examples 1300 and 1350 illustrate relative timeslot positions within an immediate parent ODU container as well as absolute timeslot positions relative to an outermost ODU container (e.g., in this example, ODU4).

Example 1300 illustrates an xcon from DWDM transponder 1140 client side (e.g., C1-A 942 of FIG. 9B) to a line side (e.g., L1-A 944 of FIG. 9B). The 192 STS-1 TSs including STS-1#1 can be received at DWDM transponder 1140 (e.g., C1-A 942 of FIG. 9B) in ODU0#1 within ODU2#1. The relative TS position is the first STS-1 in the first ODU0 within the current ODU2 on the client side of DWDM transponder 1140. The 192 STS-1 TSs including STS-1#1 can be multiplexed with other signals and carried in the absolute time slots. For example, the STS-1#1 TS can correspond to absolute timeslots 1346: STS-1#769 TS within ODU0#33 TS of ODU2#5 within ODU4#1 at a reachable carrier endpoint (e.g., L1-A 944 of FIG. 9B) that are transported across carrier-1 920 to OTN switch domain 1150. The 192 STS-1 TSs can be transported in ODU0#33-40 TS blocks within the ODU2#5 TS of ODU4#1. STS-1#1 TS can correspond to relative timeslot 1342: ODU0#1 TS within immediate parent container ODU2#5.

Example 1350 illustrates a regrooming at L1-K1 952 of FIG. 9B, where controller 110 determines that TSs#33-40 are not available on carrier-2 924, and the 192 STS-1 TSs including STS-1#1 are switched to ODU0#73-80 TS blocks for transport across carrier-2 924. Absolute timeslots 1352 illustrate STS-1#1 at L1-K1 952 as being in ODU4#1, ODU2#5, OCU0#33 TS, and STS-1#769 TS. Absolute timeslot 1354 illustrate the STS-1#1 at L1-K2 954 as being in ODU4#1, ODU2#10, OCU0#73, and STS-1#1729 TS.

Figure 14:
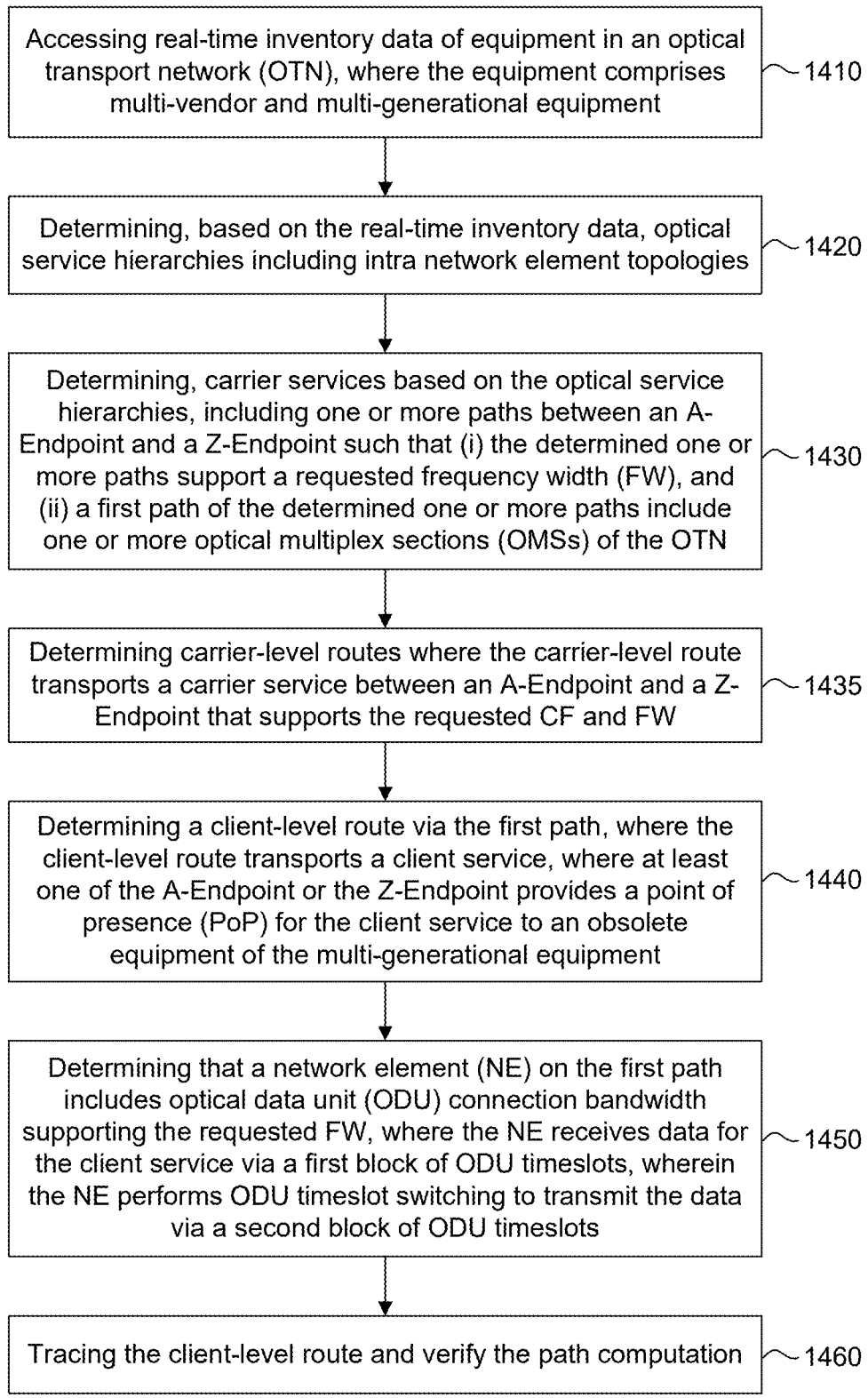
FIG. 14 illustrates a method for path computation, according to some embodiments of the disclosure.

FIG. 14 illustrates method 1400 for path computation, according to some embodiments of the disclosure. As a convenience and not a limitation, FIG. 14 may be described with reference to elements from other figures in the disclosure. For example, FIG. 14 can illustrate at a high level, interactions between controller 110 and inventory database 120 of FIG. 1 for path computation.

At 1410, controller 110 can access real-time inventory data of equipment in an OTN, where the equipment includes multi-vendor and multi-generational equipment. (See at least FIG. 1.)

At 1420, controller 110 can determine, based on the real-time inventory data, optical service hierarchies including intra network element topologies. (See at least FIG. 2, Table 1.)

At 1430, controller 110 can determine carrier services based on the optical service hierarchies, including one or more paths between an A-Endpoint and a Z-Endpoint such that (i) the determined one or more paths support a requested FW and (ii) a first path of the determined one or more paths includes one or more OMSs of the OTN. (See at least FIGS. 3-4.)

At 1435, controller 110 can determine carrier-level routes where the carrier-level route transports a carrier service between an A-Endpoint and a Z-Endpoint that supports the requested CF and FW. (See at least FIGS. 5, 6A, 6B, 7, and 8.)

At 1440, controller 110 can determine a client-level route via the first path, where the client-level route transports a client service, where at least one of the A-Endpoint or the Z-Endpoint provides a POP for the client service to an obsolete equipment of the multi-generational equipment. (See at least FIGS. 9A and 9B.)

At 1450, controller 110 can determine that a NE on the first path includes ODU connection bandwidth supporting the FW, where the NE receives data for the client service via a first block of ODU timeslots, and the NE performs ODU timeslot switching to transmit the data via a second block of ODU timeslots. (See at least FIGS. 9B, 10A, 10B, 11, 12, 13A, 13B, and Tables 2-4.)

At 1460, controller 110 can trace the client-level route and verify the path computation. (See at least FIGS. 9B, 10A, 10B, 11, 12, 13A, 13B.)

Figure 15:
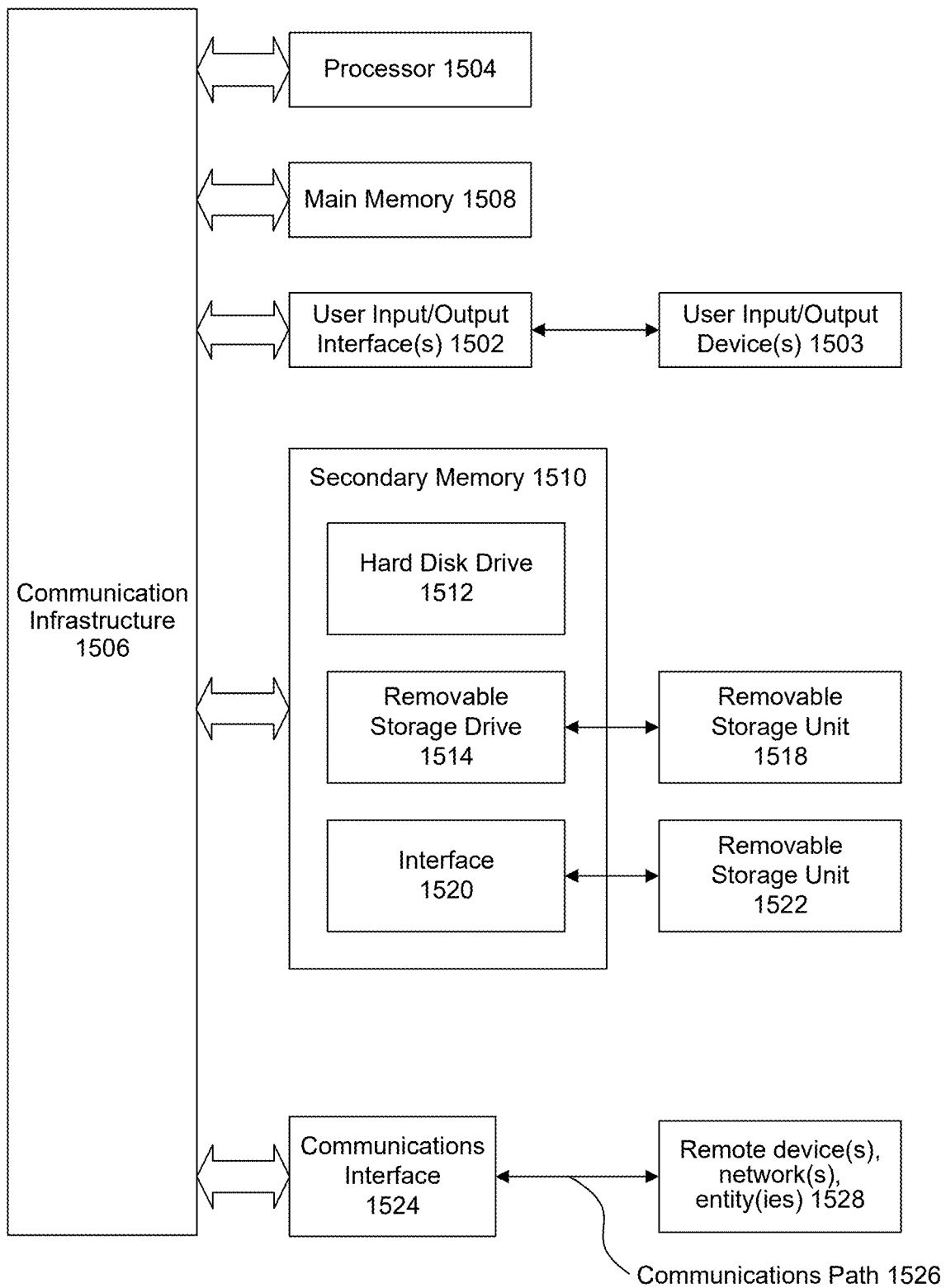
FIG. 15 is an example computer system for implementing some embodiments or portion(s) thereof.

FIG. 15 is an example computer system for implementing some embodiments or portion(s) thereof. Various embodiments can be implemented, for example, using one or more well-known computer systems, such as computer system 1500 shown in FIG. 15. Computer system 1500 can be any well-known computer capable of performing the functions described herein. For example, and without limitation, computer system 1500 may perform functions performed by controller 110 as described in: FIGS. 1-5, 6A, 6B, 7-8, 9A, 9B, 12, 13A, 13B, and can perform methods 1400 of FIG. 14, respectively. Other apparatuses and/or components shown in the figures may be implemented using computer system 1500, or portions thereof.

Computer system 1500 includes one or more processors (also called central processing units, or CPUs), such as a processor 1504. Processor 1504 is connected to a communication infrastructure 1506 that can be a bus. One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data. Processor 1504 can be communicatively coupled to main memory 1508, for example.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some embodiments, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 15. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for optical transport network (OTN) path computation, comprising:
   (a) accessing real-time inventory data of equipment in an OTN, wherein the equipment comprises multi-vendor and multi-generational equipment;
   (b) determining, based on the real-time inventory data, optical service hierarchies including intra network element topologies;
   (c) determining, based on the optical service hierarchies, one or more paths between an A-Endpoint and a Z-Endpoint such that (i) the determined one or more paths support a requested frequency width (FW) and (ii) a first path of the determined one or more paths comprises one or more optical multiplex sections (OMSs) of the OTN; and
   (d) determining a client-level route via the first path, wherein the client-level route transports a client service, wherein at least one of the A-Endpoint or the Z-Endpoint provides a point of presence (POP) for the client service to an obsolete equipment of the multi-generational equipment.

2. The computer implemented method of claim 1, wherein the obsolete equipment comprises a client-service eligible endpoint of a synchronous optical network (SONET) device supporting a synchronous transport signal level-1 (STS-1) data rate.

3. The computer-implemented method of claim 2, wherein the client-level route comprises optical data unit (ODU) timeslot switching.

4. The computer-implemented method of claim 1, further comprising determining that a network element (NE) on the first path comprises optical data unit (ODU) connection bandwidth supporting the requested FW, wherein the NE receives data for the client service via a first block of ODU timeslots, and wherein the NE performs ODU timeslot switching to transmit the data via a second block of ODU timeslots.

5. The computer-implemented method of claim 4, wherein the ODU timeslot switching occurs via a backplane port or a line port.

6. The computer implemented method of claim 1, wherein the obsolete equipment is a first synchronous optical network (SONET) device, wherein the A-Endpoint provides the POP for the client service, and wherein the Z-Endpoint provides a second POP for the client service for a second SONET device, the computer implemented method further comprising tracing the client-level route by:
   (a) tracking relative timeslots of a synchronous transport signal level-1 (STS-1) signal from the first SONET device to the second SONET device; and
   (b) tracking corresponding absolute timeslots at higher transmission rates.

7. The computer implemented method of claim 6, wherein the client-level route comprises a network element (NE), and wherein the tracking the relative timeslots comprises tracing optical paths within the NE that include an optical adjacency and a cross card mapping to a connection termination point (CTP).

8. The computer implemented method of claim 1, further comprising determining a carrier-level route via the first path, wherein the carrier-level route transports the client-level route.

9. The computer implemented method of claim 1, wherein the first path comprises:
   (a) a given center frequency (CF);
   (b) a shortest number of hops or a shortest geolocation distance from the A-Endpoint to the Z-Endpoint;
   (c) a list to include a first network element (NE); or
   (d) a list to exclude a second NE.

10. A non-transitory computer-readable medium having instructions stored thereon that, when executed by a processor of a computing device, cause the computing device to perform operations for optical transport network (OTN) path computation, the operations comprising:
   (a) accessing real-time inventory data of equipment in an OTN, wherein the equipment comprises multi-vendor and multi-generational equipment;
   (b) determining, based on the real-time inventory data, optical service hierarchies including intra network element topologies;

(c) determining, based on the optical service hierarchies, one or more paths between an A-Endpoint and a Z-Endpoint such that (i) the determined one or more paths support a requested frequency width (FW); and (ii) a first path of the determined one or more paths comprises one or more optical multiplex sections (OMSs) of the OTN; and (d) determining a client-level route via the first path, wherein the client-level route transports a client service, wherein at least one of the A-Endpoint or the Z-Endpoint provides a point of presence (POP) for the client service to an obsolete equipment of the multi-generational equipment.

11. The non-transitory computer-readable medium of claim 10, wherein the obsolete equipment comprises a client-service eligible endpoint of a synchronous optical network (SONET) device supporting a synchronous transport signal level-1 (STS-1) data rate, and wherein the client-level route comprises optical data unit (ODU) timeslot switching.

12. The non-transitory computer-readable medium of claim 10, wherein the operations further comprise determining that a network element (NE) on the first path comprises optical data unit (ODU) connection bandwidth supporting the requested FW, wherein the NE receives data for the client service via a first block of ODU timeslots, and wherein the NE performs ODU timeslot switching to transmit the data via a second block of ODU timeslots.

13. The non-transitory computer-readable medium of claim 12, wherein the ODU timeslot switching occurs via a backplane port or a line port.

14. The non-transitory computer-readable medium of claim 10, wherein the obsolete equipment is a first synchronous optical network (SONET) device, wherein the A-Endpoint provides the PoP for the client service, and wherein the Z-Endpoint provides a second POP for the client service for a second SONET device, the operations further comprising tracing the client-level route by:

(a) tracking relative timeslots of a synchronous transport signal level-1 (STS-1) signal from the first SONET device to the second SONET device; and (b) tracking corresponding absolute timeslots at higher transmission rates.

15. The non-transitory computer-readable medium of claim 14, wherein the client-level route comprises a network element (NE), the tracking the relative timeslots comprises tracing optical paths within the NE that include an optical adjacency and a cross card mapping to a connection termination point (CTP).

16. A controller comprising:
a memory; and
a processor communicatively coupled to the memory, configured to:

(a) access real-time inventory data of equipment in an OTN, wherein the equipment comprises multi-vendor and multi-generational equipment;

(b) determine, based on the real-time inventory data, optical service hierarchies including intra network element topologies;

(c) determine, based on the optical service hierarchies, one or more paths between an A-Endpoint and a Z-Endpoint such that (i) the determined one or more paths support a requested frequency width (FW) and (ii) a first path of the determined one or more paths comprising one or more optical multiplex sections (OMSs) of the OTN; and (d) determine a client-level route via the first path, wherein the client-level route transports a client service, wherein at least one of the A-Endpoint or the Z-Endpoint provides a point of presence (POP) for the client service to an obsolete equipment of the multi-generational equipment.

17. The controller of claim 16, wherein the obsolete equipment comprises a client-service eligible endpoint of a synchronous optical network (SONET) device supporting synchronous transport signal level-1 (STS-1) data rates, and wherein the client-level route comprises optical data unit (ODU) timeslot switching.

18. The controller of claim 16, wherein the processor is further configured to determine that a network element (NE) on the first path comprises optical data unit (ODU) connection bandwidth supporting the requested FW, wherein the NE receives data for the client service via a first block of ODU timeslots, and wherein the NE performs ODU timeslot switching to transmit the data via a second block of ODU timeslots, wherein the ODU timeslot switching occurs via a backplane port or a line port.

19. The controller of claim 16, wherein the obsolete equipment is a first synchronous optical network (SONET) device, wherein the A-Endpoint provides the POP for the client service, and wherein the Z-Endpoint provides a second POP for the client service for a second SONET device, to trace the client-level route, the processor is further configured to:

(a) track relative timeslots of a synchronous transport signal level-1 (STS-1) signal from the first SONET device to the second SONET device; and (b) track corresponding absolute timeslots at higher transmission rates.

20. The controller of claim 19, wherein the client-level route comprises a network element (NE), to track the relative timeslots, and wherein the processor is configured to trace optical paths within the NE that comprise an optical adjacency and a cross card mapping to a connection termination point (CTP).

* * * * *